United States Patent
Hasegawa et al.

(10) Patent No.: US 8,743,286 B2
(45) Date of Patent: Jun. 3, 2014

(54) PERIPHERAL CONTROL SYSTEM, DISPLAY DEVICE, AND PERIPHERAL

(75) Inventors: Hiroshi Hasegawa, Osaka (JP); Mamoru Oda, Osaka (JP); Kenichi Kimura, Osaka (JP); Tatsuya Yoshida, Osaka (JP); Yoshinori Satoh, Osaka (JP)

(73) Assignee: Sharp Kabushiki Kaisha, Osaka-shi (JP)

(*) Notice: Subject to any disclaimer, the term of this patent is extended or adjusted under 35 U.S.C. 154(b) by 0 days.

(21) Appl. No.: 13/498,875

(22) PCT Filed: Aug. 23, 2010

(86) PCT No.: PCT/JP2010/064141
§ 371 (c)(1),
(2), (4) Date: Mar. 28, 2012

(87) PCT Pub. No.: WO2011/040144
PCT Pub. Date: Apr. 7, 2011

(65) Prior Publication Data
US 2012/0188454 A1    Jul. 26, 2012

(30) Foreign Application Priority Data
Sep. 29, 2009  (JP) ................................. 2009-224519

(51) Int. Cl.
*H04N 5/44* (2011.01)
*H04N 5/50* (2006.01)
*H04N 11/00* (2006.01)

(52) U.S. Cl.
USPC ........... 348/563; 348/552; 348/553; 348/569; 386/231

(58) Field of Classification Search
CPC ....... H04N 5/765; H04N 5/775; H04N 5/445; H04N 5/44543; H04N 5/445413; H04N 21/436; H04N 21/43622; H04N 21/4858; H04N 21/42204; H04N 21/4312; H04N 21/4314; H04N 21/43635; H04N 5/4412; H04N 2005/44232; G09G 2370/12; G09G 2370/06
USPC ........... 348/563, 552, 553, 473, 569; 386/231
See application file for complete search history.

(56) References Cited

U.S. PATENT DOCUMENTS

| | | | |
|---|---|---|---|
| 5,648,813 A | 7/1997 | Tanigawa et al. | |
| 6,118,442 A | 9/2000 | Tanigawa | |

(Continued)

FOREIGN PATENT DOCUMENTS

| | | | |
|---|---|---|---|
| JP | 62-021379 A | 1/1987 | |
| JP | 2003-29895 A | 1/2003 | |

(Continued)

OTHER PUBLICATIONS

International Search Report, PCT/JP2010/064141, Sep. 14, 2010.

*Primary Examiner* — Brian Yenke
(74) *Attorney, Agent, or Firm* — Birch, Stewart, Kolasch & Birch, LLP

(57) ABSTRACT

A peripheral control system enhances expandability in the operation of peripheral by enabling the customization and display of operation panels for each of the peripherals, regardless of whether any operation panel exists at the display device side. The peripheral control system is configured by connecting a TV and a recorder via an HDMI connection. The TV stores operation panel information that includes array information for arraying, on the screen, image data of the operation buttons that comprise the operation panel of the recorder. The recorder stores image data of the operation buttons, and sends, according to operation panel information obtained from the TV, the aforementioned stored image data of the operation buttons in association with the array information to the TV. The TV disposes and displays image data of the operation buttons sent from the recorder, at a position that is in accordance with the array information.

16 Claims, 21 Drawing Sheets

(56) References Cited

U.S. PATENT DOCUMENTS

| | | | |
|---|---|---|---|
| 6,262,763 B1* | 7/2001 | Totsuka et al. | 348/135 |
| 6,348,956 B1 | 2/2002 | Tanigawa et al. | |
| 6,501,511 B2* | 12/2002 | Sekimoto et al. | 348/553 |
| 6,714,253 B2* | 3/2004 | Cho et al. | 348/556 |
| 6,850,286 B2 | 2/2005 | Burghard | 348/732 |
| 6,943,845 B2* | 9/2005 | Mizutome et al. | 348/555 |
| 7,095,447 B2* | 8/2006 | Lee | 348/569 |
| 7,095,450 B1* | 8/2006 | Holmes et al. | 348/586 |
| 7,206,029 B2* | 4/2007 | Cohen-Solal | 348/565 |
| 7,224,404 B2* | 5/2007 | An et al. | 348/584 |
| 7,231,603 B2* | 6/2007 | Matsumoto | 715/716 |
| 7,362,381 B1* | 4/2008 | Stahl et al. | 348/569 |
| 7,436,390 B2* | 10/2008 | Lee | 345/156 |
| 7,554,614 B2* | 6/2009 | Satou | 348/734 |
| 7,659,940 B2* | 2/2010 | Stahl et al. | 348/552 |
| 7,945,701 B2* | 5/2011 | Dai | 710/2 |
| 8,149,335 B2* | 4/2012 | Sudo et al. | 348/569 |
| 8,189,120 B2* | 5/2012 | Doyle | 348/734 |
| 8,248,530 B2* | 8/2012 | Sato | 348/552 |
| 8,294,821 B1* | 10/2012 | Overby et al. | 348/553 |
| 8,384,831 B2* | 2/2013 | Murashima | 348/734 |
| 2002/0047945 A1 | 4/2002 | Tanigawa et al. | |
| 2002/0162102 A1* | 10/2002 | Ihara | 725/9 |
| 2002/0171762 A1* | 11/2002 | Maxson et al. | 348/552 |
| 2004/0090556 A1* | 5/2004 | Kamieniecki et al. | 348/558 |
| 2004/0121725 A1 | 6/2004 | Matsui | |
| 2004/0252237 A1* | 12/2004 | Park et al. | 348/552 |
| 2005/0172332 A1* | 8/2005 | Fukuda et al. | 725/139 |
| 2007/0147799 A1* | 6/2007 | Takamori | 386/125 |
| 2007/0222896 A1* | 9/2007 | Oikawa | 348/725 |
| 2008/0046950 A1 | 2/2008 | Nakajima | |
| 2008/0080021 A1* | 4/2008 | Ohkita | 358/479 |
| 2008/0271073 A1* | 10/2008 | Kim et al. | 725/37 |
| 2008/0297656 A1* | 12/2008 | Saito | 348/554 |
| 2009/0003798 A1* | 1/2009 | Hamasaka | 386/95 |
| 2009/0051824 A1* | 2/2009 | Satou | 348/734 |
| 2009/0141180 A1* | 6/2009 | Kondo et al. | 348/723 |
| 2009/0256967 A1* | 10/2009 | Suzuki | 348/569 |
| 2009/0317054 A1* | 12/2009 | Ogasawara | 386/83 |
| 2010/0079666 A1* | 4/2010 | Osanai | 348/441 |
| 2010/0132001 A1* | 5/2010 | Kitano et al. | 725/118 |
| 2010/0208136 A1* | 8/2010 | Castano | 348/553 |
| 2010/0225814 A1* | 9/2010 | Kozono et al. | 348/554 |
| 2011/0128437 A1* | 6/2011 | Lee et al. | 348/384.1 |
| 2011/0131516 A1* | 6/2011 | Furukawa et al. | 715/764 |
| 2012/0113113 A1* | 5/2012 | Hong | 345/419 |
| 2012/0240052 A1* | 9/2012 | Kazerouni et al. | 715/747 |
| 2013/0061273 A1* | 3/2013 | Reisman | 725/86 |

FOREIGN PATENT DOCUMENTS

| | | |
|---|---|---|
| JP | 2004-166193 A | 6/2004 |
| JP | 2008-48136 A | 2/2008 |
| JP | 2008-294661 A | 12/2008 |

* cited by examiner

FIG. 3
(A)
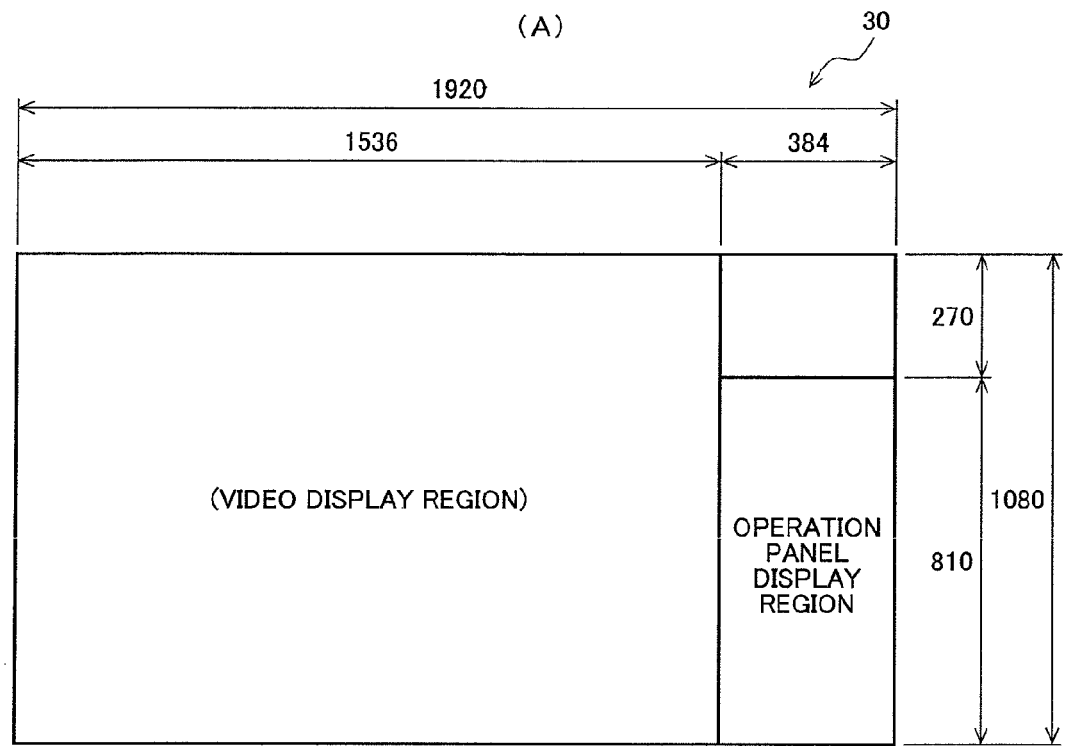
(B)
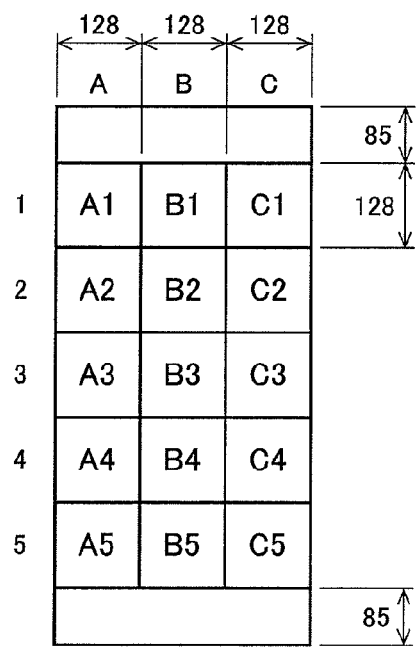

FIG. 5

| NAME | IMAGE | FUNCTION | NAME | IMAGE | FUNCTION |
|---|---|---|---|---|---|
| btn_PLAY | ▶ PLAY | RC_PLAY | btn_PLS30 | PLUS 30 SEC | RC_PLS30 |
| btn_STOP | ■ STOP | RC_STOP | btn_LIST | RECORD LIST | RC_LIST |
| btn_FF | ▶▶ FAST FORWARD | RC_FF | btn_REC | ● RECORD | RC_REC |
| btn_REW | ◀◀ FAST REWIND | RC_REW | btn_RECSTOP | RECORD STOP | RC_RECSTOP |
| btn_PAUSE | ‖ PAUSE | RC_PAUSE | btn_NEMU | START MENU | RC_MENU |
| btn_PREV | ▮◀◀ PREVIOUS | RC_PREV | btn_EPG | PROGRAM GUIDE | RC_EPG |
| btn_NEXT | ▶▶▮ NEXT | RC_NEXT | btn_POWER | POWER | RC_POWER |
| btn_MNS10 | MINUS 10 SEC | RC_MNS10 | btn_NON | NON | RC_NON |

FIG. 7
(A)
2×2    pos_2x2 = {(btn_PLAY,btn_STOP),
                 (btn_REW,btn_FF)}
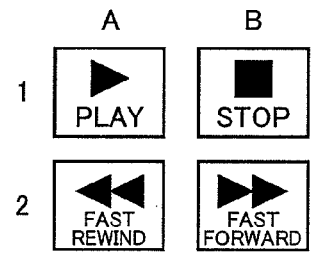
(B)
2×3    pos_2x3 = {(btn_PLAY,btn_STOP),
                 (btn_REW,btn_FF),
                 (btn_PAUSE,btn_LIST)}
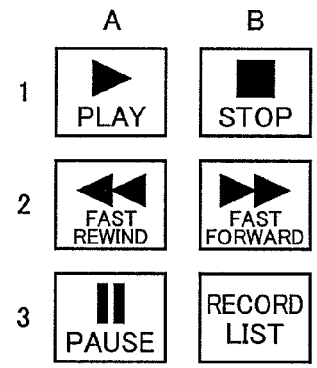
(C)
2×4    pos_2x4 = {(btn_PLAY,btn_STOP),
                 (btn_REW,btn_FF),
                 (btn_PAUSE,btn_LIST),
                 (btn_REC,btn_RECSTOP)}
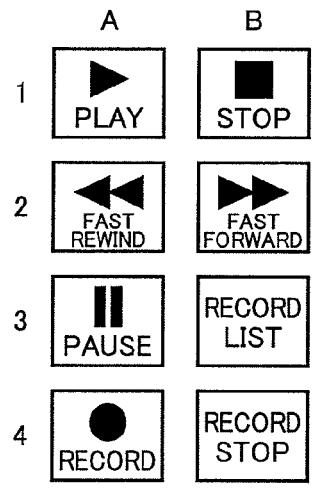

FIG. 8
(A)
3 × 3
pos_3x3 = {(btn_REW, btn_PLAY, btn_FF),
          (btn_PREV, btn_STOP, btn_NEXT),
          (btn_MNS10, btn_PAUSE, btn_PLS30)}
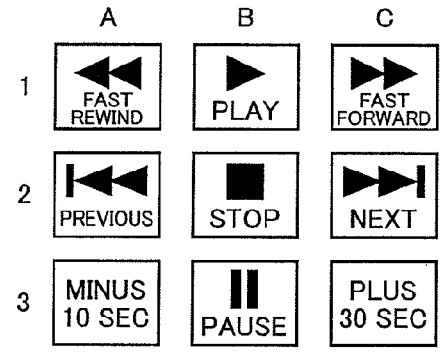
(B)
3 × 4
pos_3x4 = {(btn_REW, btn_PLAY, btn_FF),
          (btn_PREV, btn_STOP, btn_NEXT),
          (btn_MNS10, btn_PAUSE, btn_PLS30),
          (btn_REC, btn_REC, btn_RECSTOP)}
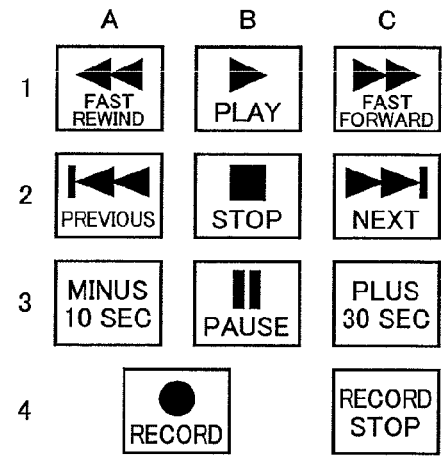
(C)
3 × 5
pos_3x5 = {(btn_POWER, btn_MENU, btn_NON),
          (btn_REW, btn_PLAY, btn_FF),
          (btn_PREV, btn_STOP, btn_NEXT),
          (btn_MNS10, btn_PAUSE, btn_PLS30),
          (btn_REC, btn_REC, btn_RECSTOP)}
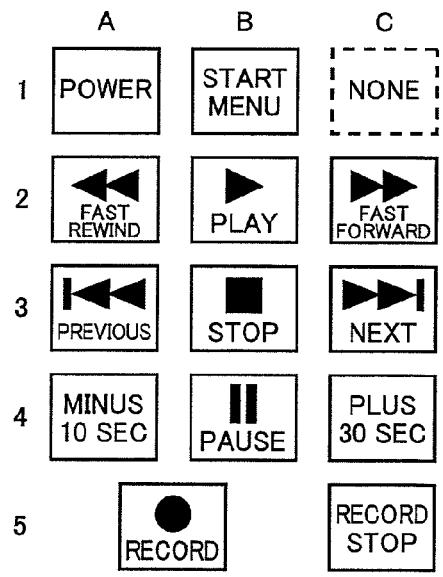

(A)

(B)

| ▶ PLAY | / B2 /「PLAY」 |
| ◀◀ FAST REWIND | / A2 /「FAST REWIND」 |
| ▶▶ FAST FORWARD | / C2 /「FAST FORWARD」 |
| ❚❚ PAUSE | / B3 /「PAUSE」 |
| MINUS 10 SEC | / A4 /「MINUS 10 MIN」 |

FIG. 23
(A)
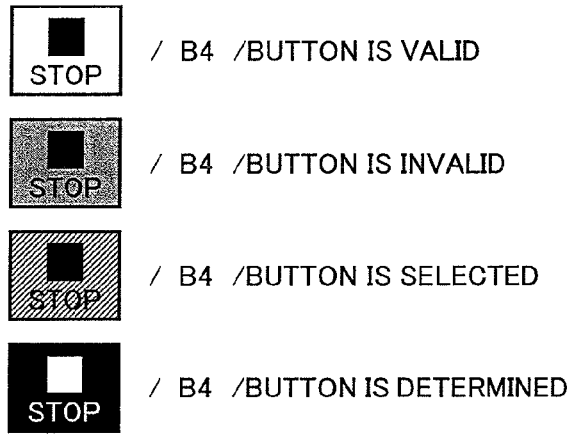
/ B4 / BUTTON IS VALID
/ B4 / BUTTON IS INVALID
/ B4 / BUTTON IS SELECTED
/ B4 / BUTTON IS DETERMINED
(B)
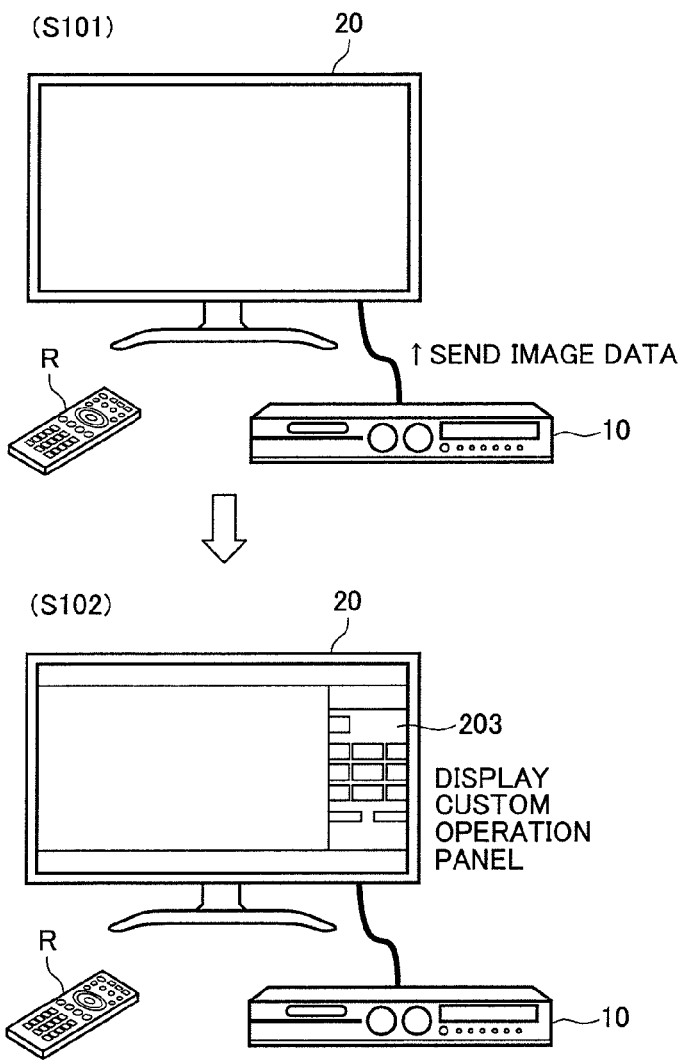

FIG. 24
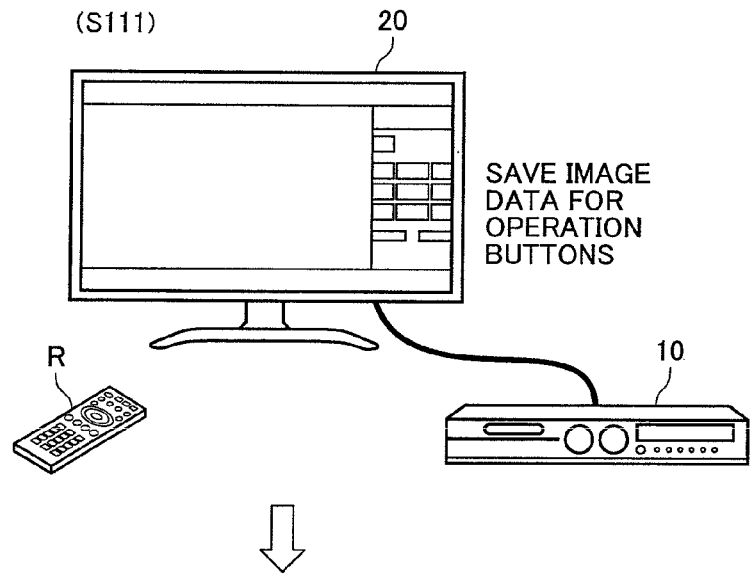
(S112)
POWER OFF/ON, CABLE DETACH/ATTACH
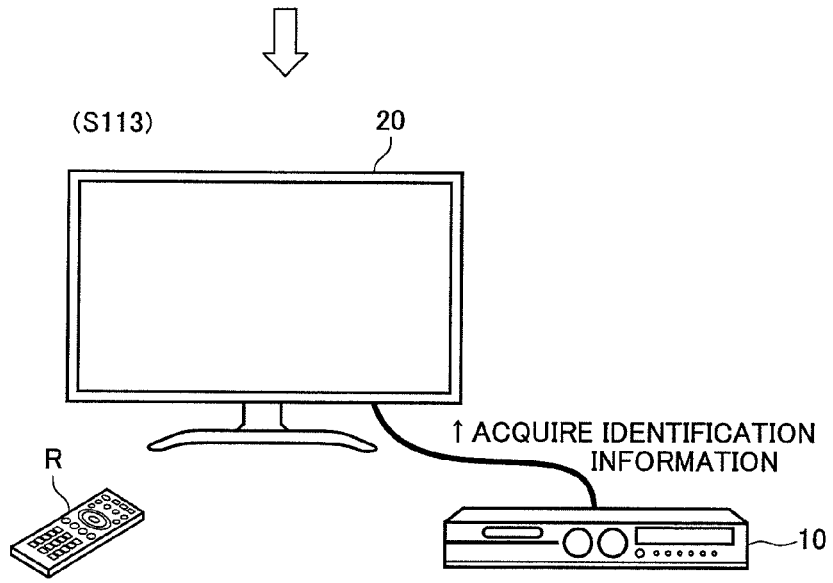

PERIPHERAL CONTROL SYSTEM, DISPLAY DEVICE, AND PERIPHERAL

TECHNICAL FIELD

The present invention relates to a peripheral control system, a display device, and a peripheral, and to a peripheral control system enabling a display device to operate a peripheral connected to the display device, a display device making up the system, and a peripheral.

BACKGROUND ART

Up until now, it has been performed to operate peripherals such as a recorder, a player, an STB (Set Top Box), and an AV amplifier through a television apparatus (TV) by connecting the peripherals to the television. For example, Patent Document 1 describes a television set capable of displaying, on its screen, operation panels for operating the peripherals. In the case of the television set described in Patent Document 1, when a menu display key of a remote control is depressed, there appear selectably on the screen a VTR, a VHD, a BS tuner, a teletext receiver, etc., as peripherals connected to the television set. Then, when the user operates the remote control to selectively specify one of the peripherals, an operation panel corresponding to the specified one appears on the television screen.

PRIOR ART DOCUMENTS

Patent Document

Patent Document 1: Japanese Laid-Open Patent Publication No. 62-21379

SUMMARY OF THE INVENTION

Problem to be Solved by the Invention

In the method described in Patent Document 1, however, the television prepares in advance the operation panels for the peripherals and changes over the operation panels in response to a specification from the user, and therefore, the television is merely allowed to connect to only the predetermined peripherals at all times. That is, the television retains in advance operation panels for specified peripherals, and hence, if the specified peripherals are connected, the television can display operation panels corresponding thereto, but if a peripheral other than the specified ones is connected, the television cannot display any operation panel since it retains no corresponding operation panel.

In this manner, when operating peripherals through the television, the operation has hitherto been limited to peripherals corresponding to operation panels retained in advance by the television, as a result of which even if the user tries connecting a new peripheral to the television, the operation through the television may be difficult to perform, leading to a problem of lacking in the expandability in the operation of the peripherals.

The present invention was conceived in view of the above circumstances, and it is an object thereof to provide a peripheral control system, a display device making up the system, and a peripheral, the peripheral control system capable of enhancing the expandability in the operation of peripherals, by enabling the customization and display of operation panels for each of the peripherals irrespective of whether the display device retains the operation panels.

Means for Solving the Problem

In order to solve the above problem, a first technical means of the present invention is a peripheral control system having at least one peripheral and a display device capable of displaying an operation panel of the peripheral connected thereto, wherein the display device comprises a first memory portion that stores operation panel information containing array information for arraying on a screen image data for operation buttons making up the operation panel of the peripheral, the peripheral comprises a second memory portion that stores the image data for operation buttons and an image data sending portion that sends the image data for operation buttons stored in the second memory portion to the display device in correspondence with the array information depending on the operation panel information acquired from the display device, and the display device disposes and displays the image data for operation buttons sent from the peripheral at a position corresponding to the array information when displaying the operation panel of the peripheral.

A second technical means is the peripheral control system as defined in the first technical means, wherein when one of the image data for operation buttons is selectively specified by a user, the display device sends the array information of the selectively specified image data to the peripheral, and wherein the peripheral comprises a data table that correlates the array information sent to the display device with functions allocated to each of the image data for operation buttons, specifies from the data table a function corresponding to the array information of the image data sent from the display device, and executes the specified function.

A third technical means is the peripheral control system as defined in the first technical means, wherein the display device scales an input video signal such that a display region of the input video signal does not overlap with a display region of the operation panel of the peripheral.

A fourth technical means is the peripheral control system as defined in the first technical means, wherein when sending the image data for operation buttons correlating to the array information to the display device, the peripheral sends attribute information indicative of an attribute of each of the image data for operation buttons to the display device.

A fifth technical means is the peripheral information display system as defined in the fourth technical means, wherein the attribute information is information indicative of whether the image data for operation buttons have a function as an operation button or have a function of a display only.

A sixth technical means is the peripheral information display system as defined in the first technical means, wherein the operation panel information includes display size information indicative of a display region size and a display position of the operation panel, and a display size of the image data for operation buttons, the array information containing arrayable positions and number of the image data for operation buttons.

A seventh technical means is the peripheral information display system as defined in the sixth technical means, wherein the array information indicates in a form of a matrix pattern the arrayable positions and number of the image data for operation buttons.

An eighth technical means is the peripheral information display system as defined in the seventh technical means, wherein the peripheral, stores and has plural types of array patterns of the image data for operation buttons, determines whether one of the plural types of array patterns coincides with a matrix pattern indicated by the array information sent from the display device, selects the coincident array pattern, if coincides, and, if not, selects a maximum array pattern accommodated within the matrix pattern indicated by the array information.

A ninth technical means is the peripheral information display system as defined in the sixth technical means, the peripheral has a first display size of the image data for operation buttons, and wherein if the first display size does not coincide with a second display size indicated by the display size information sent from the display device, then the peripheral sends, to the display device, offset information for adjusting a position to array the image data of the first display size so as to fit the second display size when sending the image data for operation buttons in correspondence with the array information to the display device.

A tenth technical means is the peripheral information display system as defined in the sixth technical means, wherein the peripheral has a first display size of the image data for operation buttons, and wherein if the first display size does not coincide with a second display size indicated by the display size information sent from the display device, then the peripheral resizes the image data of the first display size so as to fit the second display size when sending the image data for operation buttons in correspondence with the array information to the display device.

An eleventh technical means is the peripheral information display system as defined in the sixth technical means, wherein the peripheral sends, to the display device, combination information for combining a plurality of array positions indicated by the array information when sending to the display device the image data for operation buttons by correlating to the array information.

A twelfth technical means is the peripheral information display system as defined in the first technical means, wherein the display device stores and has the image data for operation buttons sent from the peripheral together with identification information of the peripheral by correlating to the array information, and wherein at the time of next connection with the peripheral, the display device specifies the image data for operation buttons stored in the display device, based on the identification information of the peripheral, the display device disposing and displaying the specified image data at a position corresponding to the array information.

A thirteenth technical means is the peripheral information display system as defined in the first technical means, wherein the peripheral sends to the display device a plurality of image data differing for each operation status for one operation button, and wherein the display device changes over and displays the plurality of image data of the operation button sent from the peripheral, depending on the operation status of the operation button.

A fourteenth technical means is the peripheral information display system as defined in the first technical means, wherein the display device determines whether the peripheral supports operation panel display function provided by the peripheral control system, if supports, sends the operation panel information to the peripheral, and, if not, displays a default operation panel corresponding to the peripheral held by the display device.

A fifteenth technical means is the peripheral information display system as defined in the first technical means, wherein the peripheral notifies the display device of substituting some of the operation buttons making up the operation panel of the peripheral with operation buttons of a default operation panel corresponding to the peripheral held by the display device, depending on the operation panel information sent from the display device, and simultaneously sends to the display device remaining image data for operation buttons making up the operation panel of the peripheral by correlating to the array information.

A sixteenth technical means is the peripheral information display system as defined in the fifteenth technical means, wherein when, based on a notice from the peripheral, substituting some of the operation buttons making up the operation panel of the peripheral with operation buttons of a default operation panel corresponding to the peripheral held by the display device, if the substituted operation button is selectively specified by the user, then the display device sends an operation command corresponding to the selectively specified operation button to the peripheral.

A seventeenth technical means is a display device making up the peripheral control system as defined in the first technical means.

An eighteenth technical means is a peripheral the peripheral control system as defined in the first technical means.

Effect of the Invention

According to the present invention, the operation panel can be customized and displayed on a peripheral-by-peripheral basis irrespective of whether the display device retains the operation panel, to thereby enable the expandability to be enhanced in the operations of the peripherals. This enables domestic peripherals to be linked to the television, allowing more peripherals to be operated through the television.

BRIEF DESCRIPTION OF DRAWINGS

FIG. 3 is a diagram for explaining an example of setting of an operation panel display region of a recorder on a display screen of a TV.

FIG. 5 is a diagram depicting an example of a data table stored in the recorder.

FIG. 7 is a diagram depicting an example of array patterns of the image data for operation buttons retained by the recorder.

FIG. 8 is a diagram depicting an example of the array patterns of the image data for operation buttons retained by the recorder.

FIG. 23 is a diagram for explaining a further display example of the custom operation panel according to the present invention.

FIG. 24 is a diagram for explaining an action example when image data for operation buttons are stored and reused in the TV.

MODES FOR CARRYING OUT THE INVENTION

Referring to the accompanying drawings, preferred embodiments will now be described of a peripheral control system, a display device configuring the system, and a peripheral, according to the present invention. The embodiments of the present invention will describe a case where the display device and the peripherals are connected to each other via an HDMI (High Definition Multimedia Interface).

More specifically, a function of HDMI Ethernet (registered trademark) Channel (hereinafter, referred to as HDMI HEC) in which two-way communications of Ethernet (registered trademark) signals are carried out through an HDMI cable is added in HDMI standard (version 1.4) published on May 28, 2009. This HDMI HEC-enabled HDMI is utilized. Naturally, the other communication means may be utilized such as HDMI CEC (Consumer Electronics Control), IEEE1394, LAN (Local Area Network), PLC (Power Line Communications), radio communication, and optical communication.

Figure 1:
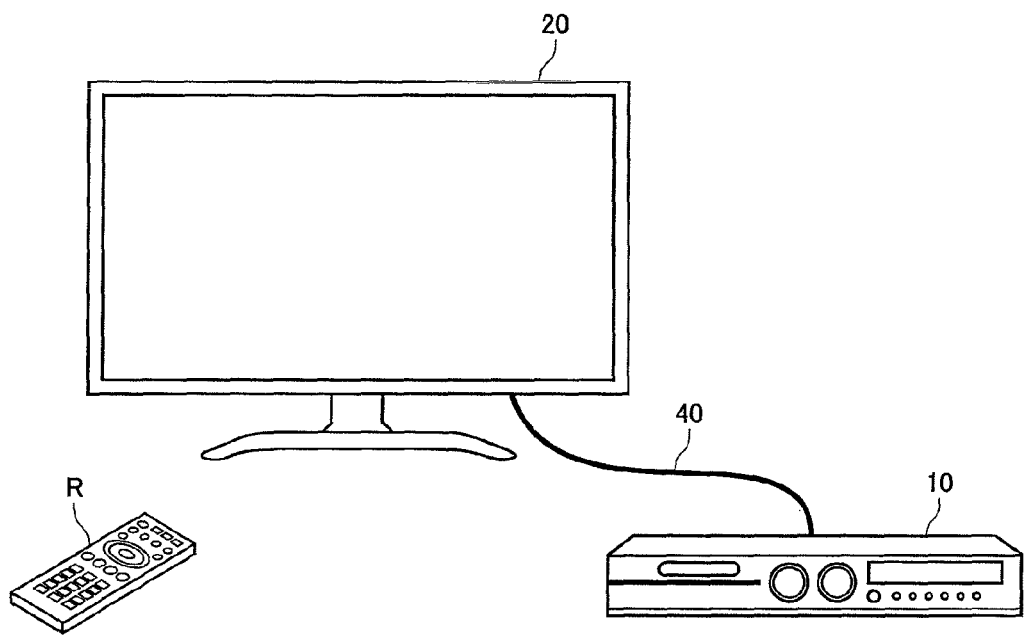
FIG. 1 is a diagram depicting an exemplary configuration of a peripheral control system according to the present invention.

FIG. 1 is a diagram depicting an exemplary configuration of a peripheral control system according to the present invention, in which 10 denotes a picture recording device (recorder) that is an example of the peripheral, 20 denotes a display device (TV), and 40 denotes an HDMI HEC-enabled HDMI cable. The recorder 10 and the TV 20 are connected to each other via the HDMI cable 40, enabling through the signal cable a transmission of video/audio signals, a transmission of Ethernet (registered trademark) signals, and a transmission of commands for device-to-device controls.

The HDMI will now be simply described. The HDMI is a digital interface for digitally connecting the TV and the peripherals and is adapted for the AV device by adding an audio transmission function and a copyright protection function to DVI that is connection standard specifications for the PC and the display. Until now, a plurality of cables for respective signals for video, audio, and control have been used for connecting the TV and the peripherals, but the HDMI merely requires a single cable so that wiring between the TV and the peripherals can be simplified.

Basic specifications as the standard for HDMI were formulated (HDMI standard version 1.0) in December, 2002 by HDMI Licensing, LLC that is a standardization organization, and thereafter the provision of CEC (Consumer Electronics Control) was added thereto as a control protocol for performing the control between AV devices in December, 2005 (HDMI standard version 1.2a).

Terms on CEC are defined in HDMI standard "2.2. Glossary of Terms", "CEC 2.2 Glossary of Terms", etc., in which a Sink device is defined as one having an HDMI input terminal to display output an AV stream, with a Source device defined as one having an HDMI output terminal to output the AV stream, and with a Repeater device defined as one having both the HDMI input terminal and the HDMI output terminal to input and output (transfer) the AV stream.

The HDMI standard defines a device-to-device control using the CEC. This CEC enables various controls based on proper physical addresses and logical addresses allocated to peripherals existing on an HDMI network. For example, if a DVD player connected via the HDMI is reproduced when the user views digital broadcasting, the television automatically performs a switch to the input to which the DVD player is connected. The remote control of the television may be used to operate a menu displayed on the DVD player or the power on/off thereof.

Figure 2:
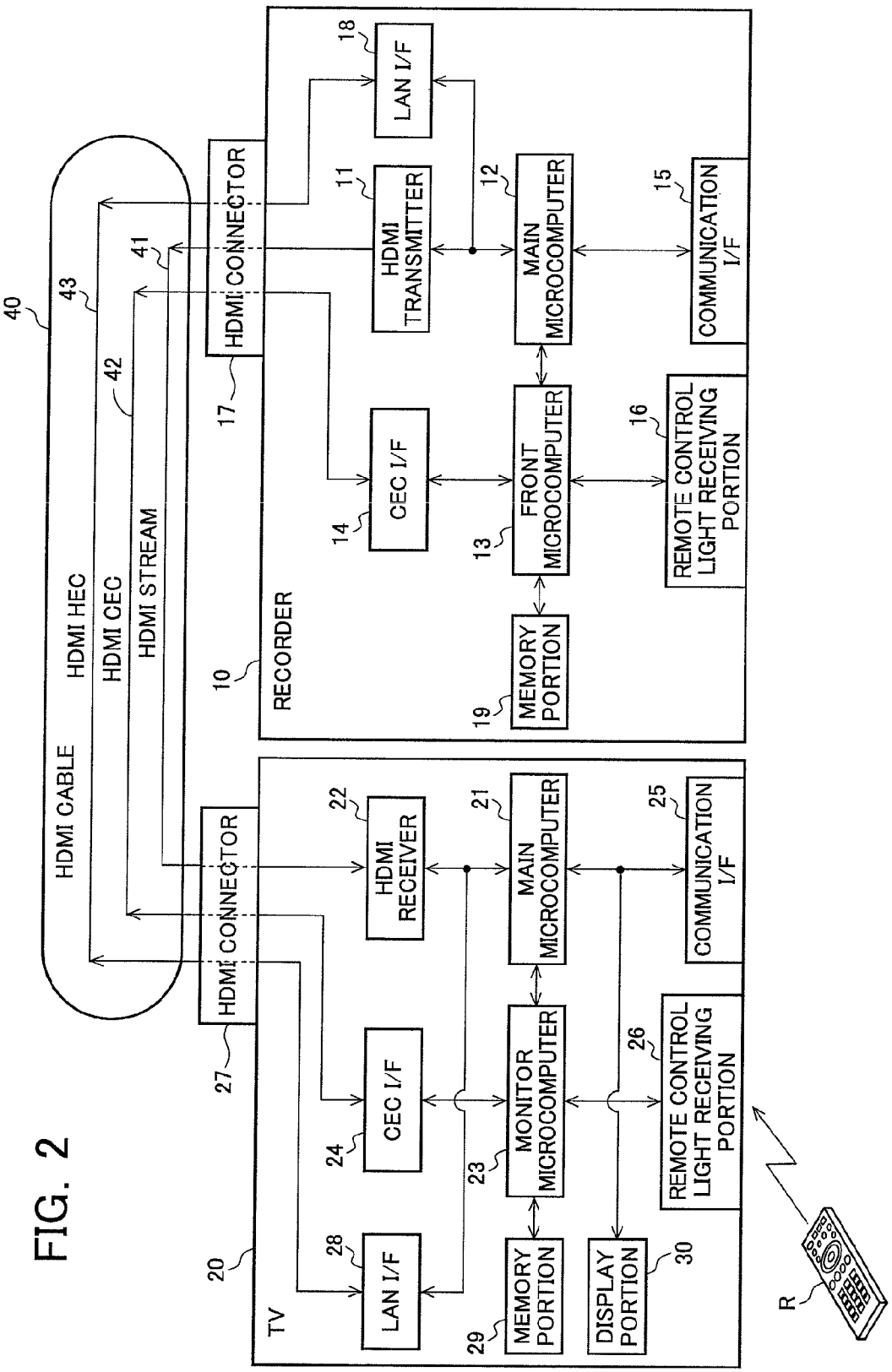
FIG. 2 is a block diagram for explaining the exemplary configuration of the peripheral control system depicted in FIG. 1.

FIG. 2 is a block diagram for explaining the exemplary configuration of the peripheral control system depicted in FIG. 1, the block diagram depicting the configuration where the recorder 10 and the TV 20 are connected via the HDMI cable 40.

The HDMI cable 40 includes a TMDS (Transition Minimized Differential Signaling) line 41 that transmits a video/audio stream as digital signals in a differential mode, a CEC line 42 that is a bidirectional bus for transmitting a control signal (CEC message) common to the peripherals, and an HEC line 43 that performs a two-way communication of the Ethernet (registered trademark) signal. The HDMI cable 40 further includes an I2C line that is used e.g., for sending EDID (Extended Display Identification Data) or for HDCP (High-bandwidth Digital Content Protection System) authentication.

The recorder 10 is provided with an HDMI transmitter 11, a main microcomputer 12, a front microcomputer 13, a CEC I/F 14, a communication I/F 15, a remote control light receiving portion 16, an HDMI connector 17, a LAN I/F 18, and a memory portion 19.

The HDMI transmitter 11 is connected via the HDMI connector 17 to the TMDS line 41 inside the HDMI cable 40, and reads out video data and audio data recorded in a recording medium such as a BD or a DVD for example to convert into an HDMI format stream consisting of video signals and audio signals interposed in blanking periods of the video signals. The stream obtained by the conversion is transmitted through the TMDS line 41 to the TV 20.

The main microcomputer 12 is a main CPU that controls the entire device and includes an HDMI controller to control the actions of the HDMI transmitter 11 and the LAN I/F 18.

The CEC I/F 14 is connected via the HDMI connector 17 to the CEC line 42 inside the HDMI cable 40 and enables a two-way communication of the CEC message with the TV 20. The action of the CEC I/F 14 is controlled by the front microcomputer 13 that includes a CEC controller, enabling the HDMI connected devices to be controlled by the CEC message. In the case of the CEC, the logical address (the device type) and the physical address (the device position) of each of the HDMI connected devices are acquired so that the CEC message can be sent to a desired device by specifying these logical address and physical address.

The front microcomputer 13 works with a low electric power and monitors at all times the CEC message transferred from the CEC line 42. The front microcomputer 13 is a sub-CPU that controls the remote control light receiving portion 16 receiving a remote control signal from a remote control device not depicted. Then, even when the main microcomputer 12 is powered off during the device standby mode, etc., the front microcomputer 13 operates and keeps enabling the sending/reception of the CEC message and the reception of the remote control signal.

The communication I/F 15 serves to perform a communication with the TV 20 via other means than the HDMI, allowing a connection with the TV 20 through communication means such as IEEE1394, LAN, PLC, radio communication, and optical communication, for example.

The LAN I/F 18 is connected via the HDMI connector 17 to the HEC line 43 inside the HDMI cable 40, to enable a two-way communication of the Ethernet (registered trademark) signals with the TV 20. The LAN I/F 18 may be incorporated within the HDMI transmitter 11.

The memory portion 19 is a nonvolatile memory such as an EEPROM (Electrically Erasable and Programmable Read Only Memory) that stores the logical addresses and the physical addresses in the HDMI and stores image data for operation buttons which will be described later. The memory portion 19 is accessed as needed by the front microcomputer 13 or the main microcomputer 12 for the execution of data reading or writing. The memory portion 19 is not limited to the EEPROM, but instead it may be for example an HD (hard disc), a flash memory, etc.

The TV 20 is provided with a main microcomputer 21, an HDMI receiver 22, a monitor microcomputer 23, a CEC I/F 24, a communication I/F 25, a remote control light receiving portion 26, an HDMI connector 27, a LAN I/F 28, a memory portion 29, and a display portion 30. A tuner is not depicted.

The HDMI receiver 22 is connected via the HDMI connector 27 to the TMDS line 41 inside the HDMI cable 40 and receives a stream transferred from the recorder 10. The HDMI receiver 22 may be incorporated within the main microcomputer 21.

The main microcomputer 21 is a main CPU that controls the entire device and includes an HDMI controller to control the actions of the HDMI receiver 22 and the LAN I/F 28.

The CEC I/F 24 is connected via the HDMI connector 27 to the CEC line 42 inside the HDMI cable 40 and enables a two-way communication of the CEC message with the recorder 10. The action of the CEC I/F 24 is controlled by the monitor microcomputer 23 that includes the CEC controller, enabling the HDMI connected devices to be controlled by the CEC message.

The monitor microcomputer 23 works with a low electric power and monitors at all times the CEC message transferred from the CEC line 42. The monitor microcomputer 23 is a sub-CPU that controls the remote control light receiving portion 26 receiving a remote control signal from a remote control device R. Then, even when the main microcomputer 21 is powered off during the device standby mode, etc., the monitor microcomputer 23 operates and keeps enabling the sending/reception of the CEC message and the reception of the remote control signal.

The communication I/F 25 is intended to perform a communication with the recorder 10 via other means than the HDMI, allowing a connection with the recorder 10 through communication means such as IEEE1394, LAN, PLC, radio communication, and optical communication, for example.

The LAN I/F 28 is connected via the HDMI connector 27 to the HEC line 43 in the HDMI cable 40 and enables a two-way communication of the Ethernet (registered trademark) signals with the recorder 10. The LAN I/F 28 may be incorporated within the HDMI receiver 22.

The memory portion 29 is a nonvolatile memory such as the EEPROM that stores the logical addresses and the physical addresses in the HDMI and that stores operation panel information which will be described later. The memory portion 29 is accessed when necessary by the monitor microcomputer 23 or the main microcomputer 21 for the execution of data reading or writing. The memory portion 29 is not limited to the EEPROM, but instead it may be for example the HD (hard disc), the flash memory, etc.

The display portion 30 is configured from a display such as an LCD (Liquid Crystal Display). In the TV 20, video/audio of the stream is separated by the HDMI receiver 22 and, if required, predetermined video signal processing and audio signal processing are performed to display a video on the display portion 30 and a sound is output from a loudspeaker (not depicted).

A main feature of the present invention lies in that the expandability in the operation of peripherals can be enhanced by making it possible to customize and display the operation panels on a peripheral-by-peripheral basis irrespective of whether the display device retains the operation panel. In the above example, the display device and the peripheral correspond respectively to the TV 20 and recorder 10.

The TV 20 has the memory portion 29 corresponding to a first memory portion that operation panel information including array information for arranging, on the screen, image data for operation buttons making up the operation panel of the recorder 10. The recorder 10 is provided with the memory portion 19 corresponding to a second memory portion that stores image data for operation buttons and the LAN I/F 18 corresponding to an image data sending portion that sends the image data for operation buttons stored in the memory portion 19 in correspondence with the array information to the TV 20, depending on the operation panel information acquired from the TV 20. When displaying the operation panel of the recorder 10, the TV 20 arranges and displays the image data for operation buttons sent from the recorder 10 at positions corresponding to the array information.

Then, when any image data for operation buttons is selectively specified by the user, the TV 20 sends the array information on the selectively specified image data to the recorder 10. The recorder 10 is provided with a data table that correlates the array information sent to the TV 20 with functions allocated respectively to the image data for operation buttons, and the recorder 10 is controlled to identify from the data table a function corresponding to the array information on the image data sent from the recorder 10, to execute the identified function. The data table is intended to be stored in the memory portion 19.

The operation panel information is intended to contain, specifically, in addition to the above array information, the display region size, the display position, the number of the display colors, and the display size of the image data for operation buttons, of the operation panel. The array information represents arrayable position and number of image data for operation buttons in the form of a matrix pattern of e.g., 3 columns (A, B, and C)×5 rows (1, 2, 3, 4, and 5), the number of image data arrayable being 15 in this case.

In the above, the image data for operation buttons include image data functioning as the operation buttons themselves and used as the real operation buttons, and image data used only for the representation such as operation guidance (operational explanation). The image data format may be any format as long as it can handle images of bitmap, JPEG (Joint Photographic Experts Group), etc.

The recorder 10 may send to the TV 20 attribute information together with image data of operation buttons and/or operation guidance and array information thereof (see FIG. 22 described later). This attribute information is information indicative of whether the image data for operation buttons have functions as operation buttons or has a function of only the display. Then, the TV 20 can display the operation guidance button on the operation panel similar to the operation buttons, but since the attribute of the guidance button is only the display, control is provided such that even if the user acts on the remote control device R to depress the operation guidance button, the array information thereof is not sent to the recorder 10. Control may also be provided such that the operation guidance button cannot be selected by preventing a cursor from moving thereto.

When the recorder 10 acquires 3 columns×5 rows as the array information from the TV 20, it allocates the image data for operation buttons, for example, image data of "power button" to column A, row 1, and image data of "play button" to column A, row 2, and sends the image data for operation buttons in correspondence with the array information to the TV 20. The recorder 10 stores the correspondence relationships (image data, array, and function) at that time as the data table in the memory portion 19. Then, the TV 20 arrays and displays the image data for operation buttons sent form the recorder 10 in compliance with the positions (hereinafter, also called coordinates) indicated by the array information.

Although the TV 20 can display the operation panel containing the image data for operation buttons of the recorder 10 in this manner, the TV 20 has merely to provide the display region of the operation panel and the recorder 10 determines which one of operation button image data is to be disposed at which position, whereupon as long as supporting the operation panel expansion display function according to the present invention, any peripherals can display the operation panel.

When one of the image data for operation buttons on the screen is selectively specified by the user acting on the remote control device R, the TV 20 has only to send the coordinate of the image data for the operation button, not the operation command of that operation button, to the recorder 10. Based on the coordinate sent from the TV 20, the recorder 10 can specify a corresponding function and execute the function. For example, if the coordinate is "column A, row 2 (A2)", "play button" is allocated thereto allowing the recorder 10 to execute a play.

In this manner, according to the present invention, the operation panel can be customized and displayed on a peripheral-by-peripheral basis irrespective of whether the display device retains the operation panel, thereby achieving enhanced expandability in the operation of the peripherals.

Although the recorder 10 acquires the operation panel information from the TV 20 at this time, two methods are conceivable in the case of the HDMI connection, i.e., a first method of utilizing the EDID and a second method of utilizing a vendor command of the CEC message.

The Sink device (TV 20 in this case) in conformity with the HDMI standard has the EDID in its internal memory. The EDID is an ID proper to the TV for transmitting the TV model name and set values (resolution, etc.) to the Source device (recorder 10 in this case) connected to the TV, and an HDMI control signal line (12C) is used for the interchange of the EDID. For example, when the recorder 10 is connected to the TV 20 via the HDMI, the recorder 20 accesses the TV 20 to read the EDID so that it can output videos at a resolution adapted to the TV 20.

In the first method, the operation panel information is written in advance into the EDID. This allows the recorder 10 when accessing the TV 20 to read in and acquire the operation panel information contained in the EDID.

In the second method, the CEC message is sent together with the operation panel information added thereto from the TV 20 to the recorder 10. Available as the CEC message may there be e.g., the vendor command that the maker can define on its own terms.

At this time, the TV 20 performs a scaling of the input video signal, which will be described below, so as to prevent the display region of the input video signal from overlapping the display region of the operation panel of the recorder 10.

FIG. 3 is a diagram for explaining an example of setting of the operation panel display region of the recorder 10 on the display screen of the TV 20. FIG. 3(A) depicts an example of setting of the operation panel display region in which the operation panel of the recorder 10 is displayed, and FIG. 3(B) depicts a matrix information (array information) for arraying image data for operation buttons making up the operation panel.

In the example of FIG. 3(A), the screen specifications of the display portion 30 of the TV 20 are such that the effective pixel count per line (horizontal direction) is 1920 pixels and that the effective pixel count in the vertical direction is 1080 pixels. The size of the video signal display region is 1536×1080, the size of the display region of the operation panel of the recorder 10 is 384×810, and the display position of the operation panel is (1536, 270). In this manner, the TV 20 sets in advance the display region of the operation panel of the recorder 10. Then, the TV 20 scales and displays the input video signal so as to fit the display region size (1536×1080) of the video signal. The display region size of the operation panel may properly be determined depending on the inch size of the TV 20.

For example, in the case where the user allows a display of the operation panel of the recorder 10 by the operation of the remote control device R during viewing a program on the TV 20, the video signal of the program is subjected to the scaling so that the video in the program does not overlap with the operation panel.

This prevents the video in the program from being hidden by the operation panel during watching, and the visual recognizability is not impaired.

The example of FIG. 3(B) depicts a matrix pattern for arraying the image data for operation buttons making up the operation panel, in which example the display size of the image data for one operation button is set to 128×128, with these image data being arrayed in a matrix form of 3 columns (A, B, and C)×5 rows (1, 2, 3, 4, and 5). This case allows the array of 15 image data for operation buttons. Then, the TV 20 manages coordinates (in this case, column A, row 1; column A, row 2; . . . ) in 3 columns×5 rows, and, when receiving image data for an operation button and a corresponding coordinate from the recorder 10, disposes the image data for the operation button at a position corresponding to the corresponding coordinate.

As set forth hereinabove, the operation panel information is composed of five pieces of information, i.e., the display region size, the display position, and the number of display colors of the operation panel as well as the display size of the image data for operation buttons and array information (matrix pattern) indicating, in a matrix form, the arrayable position and number of image data for operation buttons, and in this example, those being set to 384×810, (1536, 270), 256 colors, 128×128, and 3 columns, 5 rows in the mentioned order. Then, this operation panel information is acquired by the recorder 10, by being sent to the recorder 10 from the TV 20 using the CEC message or by reading the EDID of the TV 20 by the recorder 10.

Figure 4:
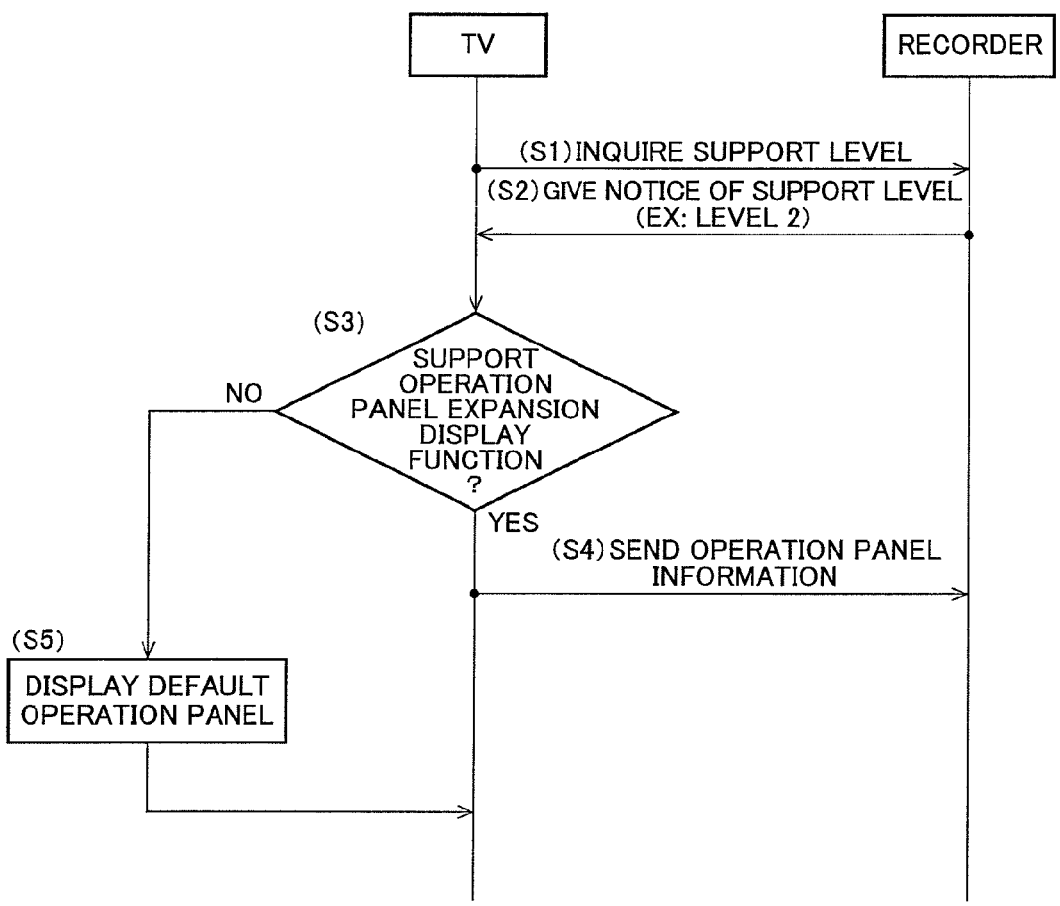
FIG. 4 is a diagram depicting an example of a method of the recorder acquiring operation panel information from the TV.

FIG. 4 is a diagram for explaining an example of a method of the recorder 19 acquiring the operation panel information from the TV 20. In this case, the recorder 10 connected to the TV 20 does not necessarily support an operation panel display function of the present invention (i.e., an operation panel display function provided by the peripheral control system of the present invention). Accordingly, this example is configured such that, when the TV 20 and the recorder 10 are connected via the HDMI, the TV 20 inquires the support level of the recorder 10 and, depending on the result, sends the operation panel information to the recorder 10.

First, the TV 20 inquires of the recorder 10 a support level for determining whether it supports the operation panel expansion display function according to the present invention (S1), and the recorder 10 returns (notifies) its own support level to the TV 20 (S2). The recorder 10 retains in advance its own support level in the internal memory and retains "level 1" if not supported and "level 2" if supported.

Then, the TV 20 determines whether recorder 10 supports the operation panel expansion display function, based on the support level returned from the recorder 10 (S3). At that time, if the return from the recorder 10 is "level 2", then the TV 20 determines that the recorder 10 is a supporting peripheral (case of YES) and sends the operation panel information to the recorder 10 (S4). If the return from the recorder 10 is "level 1" at S3, then the TV 20 determines it as being an unsupporting peripheral (case of NO) and displays an operation panel for the default of the recorder 10 that the TV 20 has (S5). In the absence of any return to the inquiry at S1, the TV 20 may determine the recorder 10 as being unsupporting.

The operation panel for the default (hereinafter, referred to as default operation panel) of the recorder 10 at S5 means an operation panel corresponding to the recorder 10 that the TV 20 has in advance, and it differs from the operation panel according to the present invention (hereinafter, it is often referred to as a custom operation panel). This default operation panel is intended, similar to the prior art, to allow the user to operate the remote control device R to send an operation command of an operation button selectively specified. In case that the peripheral connected to the TV 20 is an unsupporting peripheral and that the TV 20 has no default operation panel, the TV 20 desirably makes an error display, etc., since it cannot display the operation panel.

Although this example may use the vendor command of the CEC message for example for the communication between the TV 20 and the recorder 10, the communication means is not limited to the CEC.

FIG. 5 is a diagram depicting an example of a data table stored in the recorder 10. The data table containing image data for operation buttons shown in this example shall be stored in the memory portion 19. In this manner, the recorder 10 manages, in the form of the data table, a name, image data, and a function (remote control function corresponding to an operation button) for each of the operation buttons. Then, when determining a coordinate of the image data for the operation button in accordance with the operation panel information from the TV 20, it adds the coordinate to the data table. This allows the coordinates of the image data for operation buttons to be correlated with the function of each of the operation buttons, so that, based on the data table, the recorder 10 can specify and execute a function corresponding to the coordinate sent from the TV 20.

Figure 6:
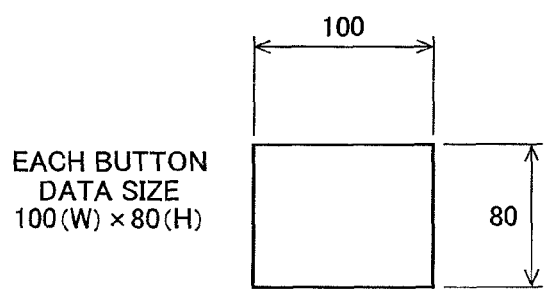
FIG. 6 is a diagram depicting an example of a display size of image data for operation buttons depicted in FIG. 5.

FIG. 6 is a diagram depicting an example of the display size of the image data for operation buttons depicted in FIG. 5. In this example, the image data for operation buttons are each defined as having a display size of 100×80. Information on this display size shall be retained in the memory portion 19 of the recorder 10. Although the display size of the image data for operation buttons is properly optimized based on the operation panel information acquired from the TV 20, this will hereinafter be described referring to FIG. 9.

FIGS. 7 and 8 are diagrams depicting an example of array patterns of the image data for operation buttons retained by the recorder 10. In this manner, the recorder 10 may store a plurality of different array patterns of the image data for operation buttons in the memory portion 19. FIG. 7(A) depicts an example of the array pattern of 2×2, FIG. 7(B) depicts an example of the array pattern of 2×3, and FIG. 7(C) depicts an example of the array pattern of 2×4. FIG. 8(A) depicts an example of the array pattern of 3×3, FIG. 8(B) depicts an example of the array pattern of 3×4, and FIG. 8(C) depicts an example of the array pattern of 3×5. The array pattern of 3×5 depicted in FIG. 8(C) coincides with the matrix pattern (3×5) depicted in FIG. 3(B) described earlier.

The 2×2 array pattern depicted in FIG. 7(A) is defined as pos__2×2. This allocates a play button, a stop button, a fast rewind button, and a fast forward button to coordinates A1, B1, A2, and B2, respectively. The same rule is applied to the definition of the other array patterns. In FIG. 8(B), a record button (btn_REC) is defined so as to extend over two coordinates (A4 and B4). Specifically, a rule may be determined in advance that if the same button (e.g., record button (btn_REC) is allocated to both the coordinates A4 and B4, then A4 and B4 are combined to display a single operation button by two coordinates.

Figure 9:
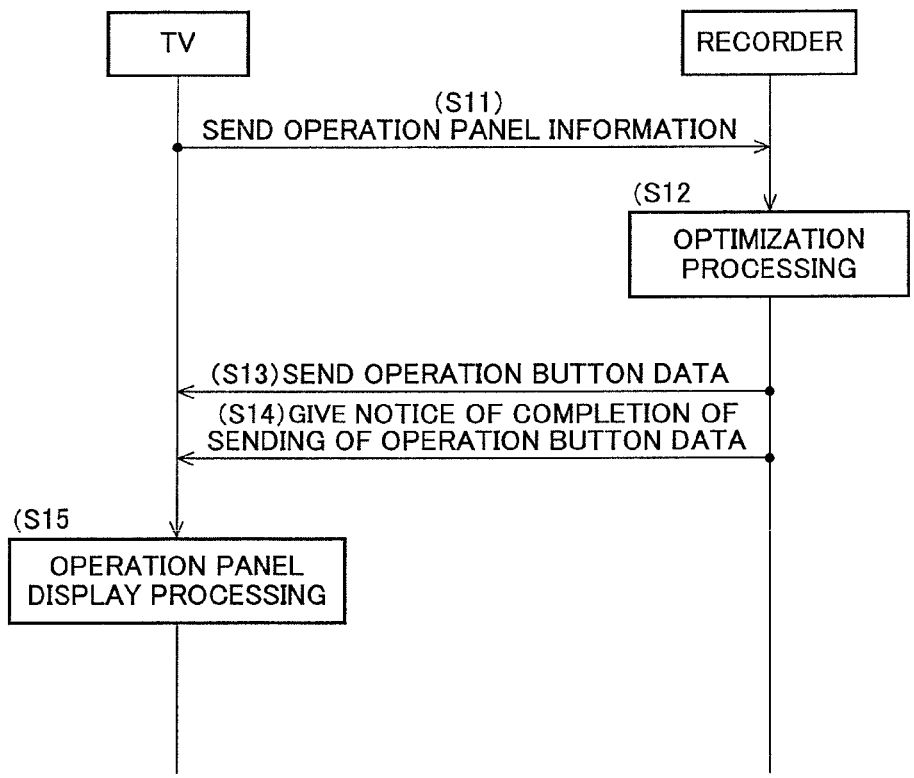
FIG. 9 is a diagram for explaining an example of operation panel optimization processing effected by the recorder.

FIG. 9 is a diagram for explaining an example of operation panel optimization processing effected by the recorder 10. In this example, the recorder 10 shall retain six different array patterns depicted in FIGS. 7 and 8, i.e., pos__2×2, pos__2×3, pos__2×4, pos__3×3, pos__3×4, and pos__3×5.

First, as set forth above referring to FIG. 4, the TV 20 sends operation panel information to the recorder 10 if it confirms that the recorder 10 supports the operation panel expansion display function (S11). In this example, the operation panel information sent includes the display region size of the operation panel: 384×810, the display position thereof: (1536, 270), the number of display colors thereof: 256 colors, the display size of the image data for operation buttons: 128×128, the matrix pattern of the image data for operation panels: 3 columns, 5 rows.

Next, the recorder 10 performs optimization processing of the operation panel depending on the operation panel information sent from the TV 20 (S12). As first optimization processing, the recorder 10 determines whether among a plurality of different array patterns held by the recorder 10 there is one coinciding with the matrix pattern sent from the TV 20, and, if there is one coinciding therewith, selects the coinciding array pattern, and, if there is no one coinciding therewith, selects the maximum array pattern accommodated within the matrix pattern.

Since the matrix pattern from the TV 20 is 3×5 in this example, the array pattern of pos__3×5 is determined to coincide therewith among the plurality of array patterns stored in the recorder 10. In a case for example where the matrix pattern from the TV 20 is 2×5 without any array pattern coinciding therewith, the maximum array pattern accommodated within the 2×5 matrix pattern is determined to be 2×4. In this case, one row is blank.

It is determined as second optimization processing whether the image data for operation buttons coincide in display size. Here, a first display size of the image data for operation buttons held by the recorder 10 is 100×80 (FIG. 6) while a second display size of the image data for operation buttons sent from the TV is 128×128 (FIG. 3(B)). Since in this case the first display size held by the recorder 10 does not coincide with the second display size sent from the TV 20, the recorder 10 performs an offset calculation for adjusting the position to array the image data of the first display size so as to fit the second display size.

The recorder 10 may retain image data for operation buttons of a plurality of display sizes corresponding to the custom operation panel so that any one is selected from among these image data for operation buttons. If, for example, there exists image data for operation buttons coinciding with the second display size sent from the TV 20, the recorder 10 selects this image data for operation buttons, whereas if there exists no image data for operation buttons coinciding with the second display size, it selects image data for operation buttons smaller than the second display size. Then, similar to the above, if the display sizes do not coincide, the recorder 10 performs offset/resizing processing.

Figure 10:
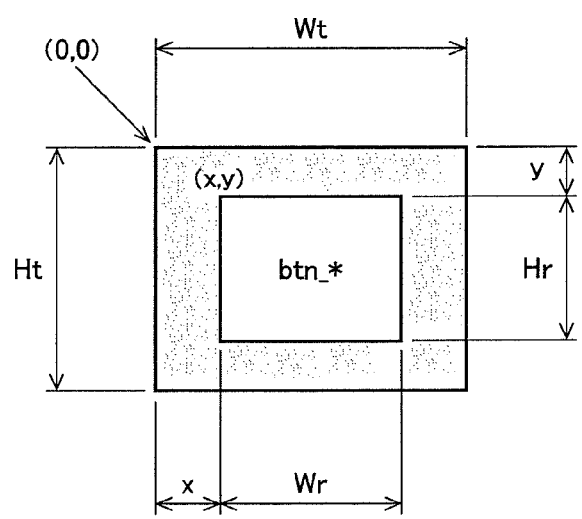
FIG. 10 is a diagram for explaining offset processing of image data for operation buttons.

As depicted in FIG. 10, since the second display size of the TV 20 is Wt×Ht (128×128) and the first display size of the recorder 10 is Wr×Hr (100×80), the second display size of the TV 10 is greater than the first display size of the recorder 10. In such a case, the recorder 10 performs for example an offset calculation for centering and displaying the image data for operation buttons. Specifically, the calculation results in $$x=(Wt-Wr)/2=14, y=(Ht-Hr)/2=24$$

to consequently obtain the offset amount (x=14, y=24). Then, when sending the image data for operation buttons to the TV 20, the recorder 10 sends the obtained offset amount as the offset information thereto.

If the first display size retained by the recorder 10 does not coincide with the second display size sent from the TV 20, the recorder 10 may resize the image data of the first display size so as to fit the second display size. If, for example, the first display size of the recorder 10< the second display size of the TV 20 as described above, it may expand the image data of the first display size so as to be of the same size as the second display size. On the contrary, if the first display size of the recorder 10> the second display size of the TV 20, it may reduce the image data of the first display size to be of the same size as the second display size.

Figure 11:
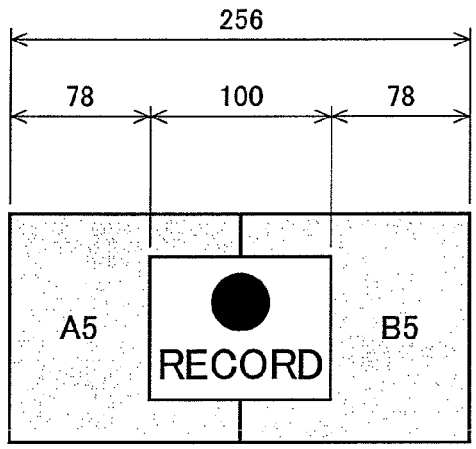
FIG. 11 is a diagram for explaining combination processing that combines a plurality of regions.

As depicted in FIG. 11, when sending image data for operation buttons to the TV 20, the recorder 10 may send thereto combination information for allowing combination processing through which are combined a plurality of array positions indicated by the matrix pattern from the TV 20. In this example, it allocates the record button to both the regions of coordinates A5 and B5 and then calculates an offset amount of the display position to adjust the display position. The offset amount in this case is calculated as x=78 and y=24.

In FIG. 9, after the execution of the operation panel optimization processing as described above, the recorder 10 sends operation button data to the TV 20 (S13). The operation button data include, in addition to the image data for operation buttons and coordinates indicative of their array positions, offset information (e.g., x=14, y=24) of the image data for operation buttons, attributes (e.g., operation button, either only display or blank) of the image data for operation buttons, and combination information (e.g., combining A5 and B5) used when combining a plurality of array positions. Then, the recorder 10 notifies the TV 20 of the completion of sending of operation button data (S14), while the TV 20 performs operation panel display processing based on the operation button data sent from the recorder 10 (S15).

Since image data are sent in the processing of data sending from the recorder 10 to the TV 20, a more high-speed data sending becomes feasible by using the HDMI HEC line 43 higher in the communication speed than the HDMI CEC line 42.

Figure 12:
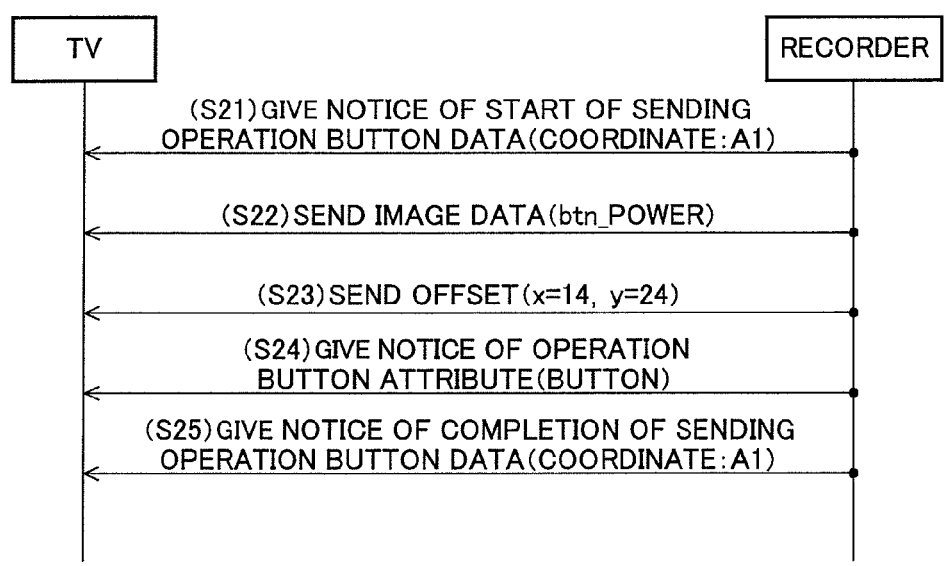
FIG. 12 is a diagram for explaining an example of processing performed when arraying a power button at a coordinate A1.

FIG. 12 is a diagram for explaining an example of processing performed when arraying the power button at the coordinate A1. The recorder 10 notifies the TV 20 of the start of sending thereto the operation button data on the coordinate A1 (S21). Then, the recorder 10 sends image data (btn_POWER) for operation buttons to the TV 20 (S22), sends thereto the offset information (x=14 and y=24 in this case) depicted in FIG. 10 (S23), and notifies it of the attributes ("button" in this case) of the operation buttons (S24). Finally, the recorder 10 notifies the TV 20 of the completion of sending thereto the operation button data on the coordinate A1 (S25).

Figure 13:
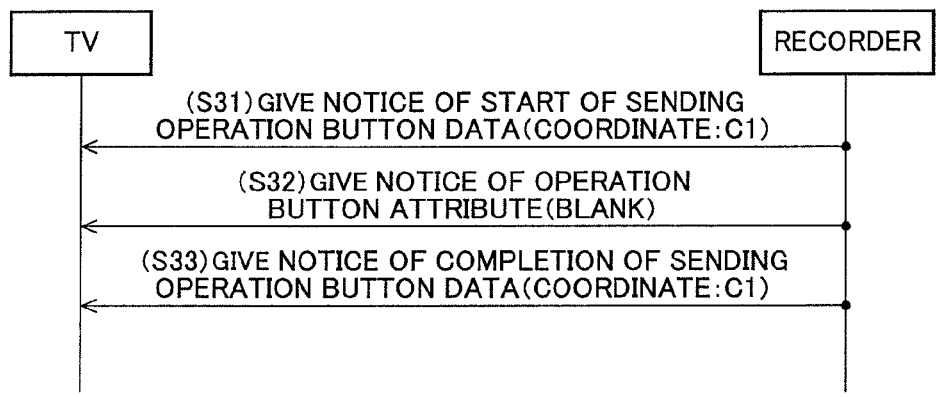
FIG. 13 is a diagram for explaining an example of processing performed when blanking a region of a coordinate C1.

FIG. 13 is a diagram for explaining an example of processing performed when blanking the region of the coordinate C1. The recorder 10 notifies the TV 20 of the start of sending thereto the operation button data on the coordinate C1 (S31). Then, the recorder 10 notifies the TV 20 of the attribute "blank" of the operation button (S32). Finally, the recorder 10 notifies the TV 20 of the completion of sending thereto the operation button data on the coordinate C1 (S33).

Figure 14:
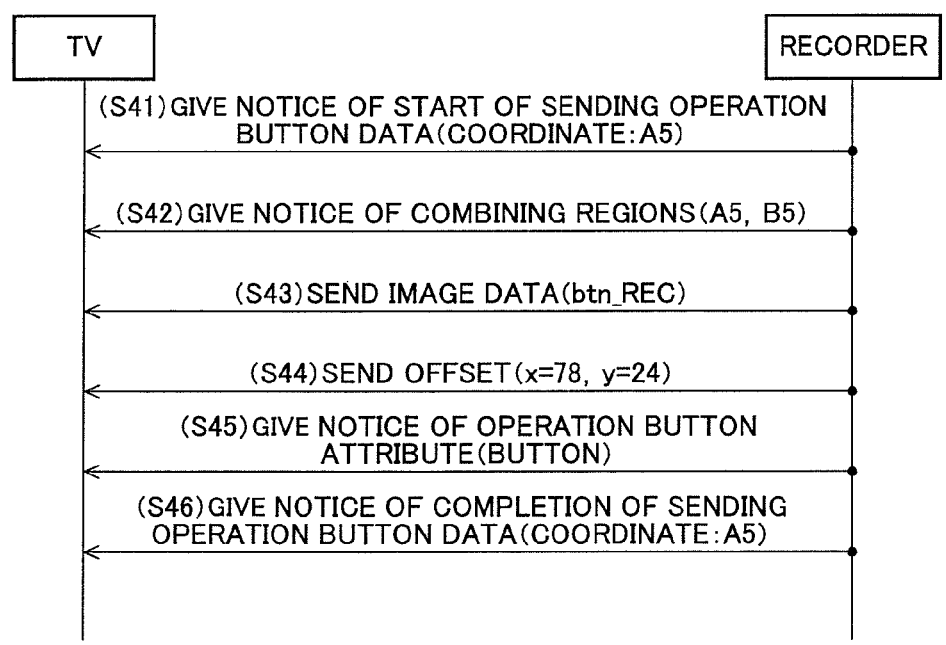
FIG. 14 is a diagram for explaining an example of processing performed when combining a region of a coordinate A5 and a region of a coordinate B5 to array a record button thereon.

FIG. 14 is a diagram for explaining an example of processing performed when combining the region of the coordinate A5 and the region of the coordinate B5 to array the record button thereon. The recorder 10 notifies the TV 20 of the start of sending the operation button data on the coordinate A5 (S41) and notifies it of combining the regions of the coordinates A5 and B5 (S42). Then, the recorder sends image data (btn_REC) for operation buttons to the TV 20 (S43), sends thereto the offset information (x=78, y=24 in this case) depicted in FIG. 11 (S44), and notifies it of the attribute ("button" in this case) of the operation button (S45). At the end, the recorder 10 notifies the TV 20 of the completion of sending the operation button data on the coordinate A5 (S46).

Here, the TV 20 may store the image data for operation buttons sent from the recorder 10, together with the identification information of the recorder 10, in correspondence with the coordinate. In this case, at the time of next connection with the recorder 10, the TV 20 specifies image data for operation buttons stored in the TV 20, based on the identification information of the recorder 10, and disposes and displays the specified image data at a position corresponding to the coordinate. This eliminates the necessity of sending image data for operation buttons each time of power on/off or detachment/attachment of the HDMI cable, thereby reducing the communication load.

Use may be made of a part of a default operation panel held by the TV 20. In this case, the recorder 10 notifies the TV 20 of substituting, in accordance with the operation panel information sent from the TV 20, some of the operation buttons making up the operation panel of the recorder 10 with operation buttons of the default operation panel corresponding to the recorder 10 held by the TV 20. Then, the recorder 10 is configured to send to the TV 20 image data for the remaining operation buttons making up the operation panel of the recorder 10, in correspondence with the coordinate.

The TV 20 substitutes, based on the notice from the recorder 10, the some of the operation buttons making up the operation panel of the recorder 10 with the operation buttons of the default operation panel. Then, when the user acts on the remote control device R to selectively specify the substituted operation button, the TV 20 sends to the recorder 10 an operation command corresponding to the selectively specified operation button. That is, the operation command is sent for the operation buttons substituted by the default operation panel, whereas the coordinate is sent for the operation buttons of the custom operation panel. As a result, the recorder 10 need not send image data for all the operation buttons making up the operation panel, contributing to a reduction in the communication load.

The recorder 10 may retain in advance a plurality of image data that defer for each operation status for one operation button and send them to the TV 20. In this case, the TV 20 is configured to change over and display the plurality of image data of the operation button sent from the recorder 10, depending on the operation status of that operation button. The TV 20 changes over, for each operation button, the plurality of image data depending on the operation status of the recorder 10 such as for example valid, invalid (inoperable), selection, and determination. Specifically, the recorder 10 may notify the TV 20 of the operation status of the operation button, while in response to the notice, the TV may change over the plurality of image data depending on the operation status notified of.

For example, if the recorder 10 determines the stop button to be inoperable, then it notifies the TV 20 of the fact. When receiving the notice, the TV 20 changes over the image data of the stop button to image data indicative of being inoperable for the display. If the stop button in inoperable status is depressed and selectively specified, then control is provided such that the TV 20 does not send the coordinate of the stop button to the recorder 10. Alternatively, the TV 20 may gray out the stop button so that the button cannot be selected or may prohibit the cursor from moving to the position of the stop button so that the button cannot be selected.

Exemplary actions of the peripheral control system according to the present invention will now be described based on the screen transition of the TV 20 depicted in FIGS. 15 to 24.

Figure 15:
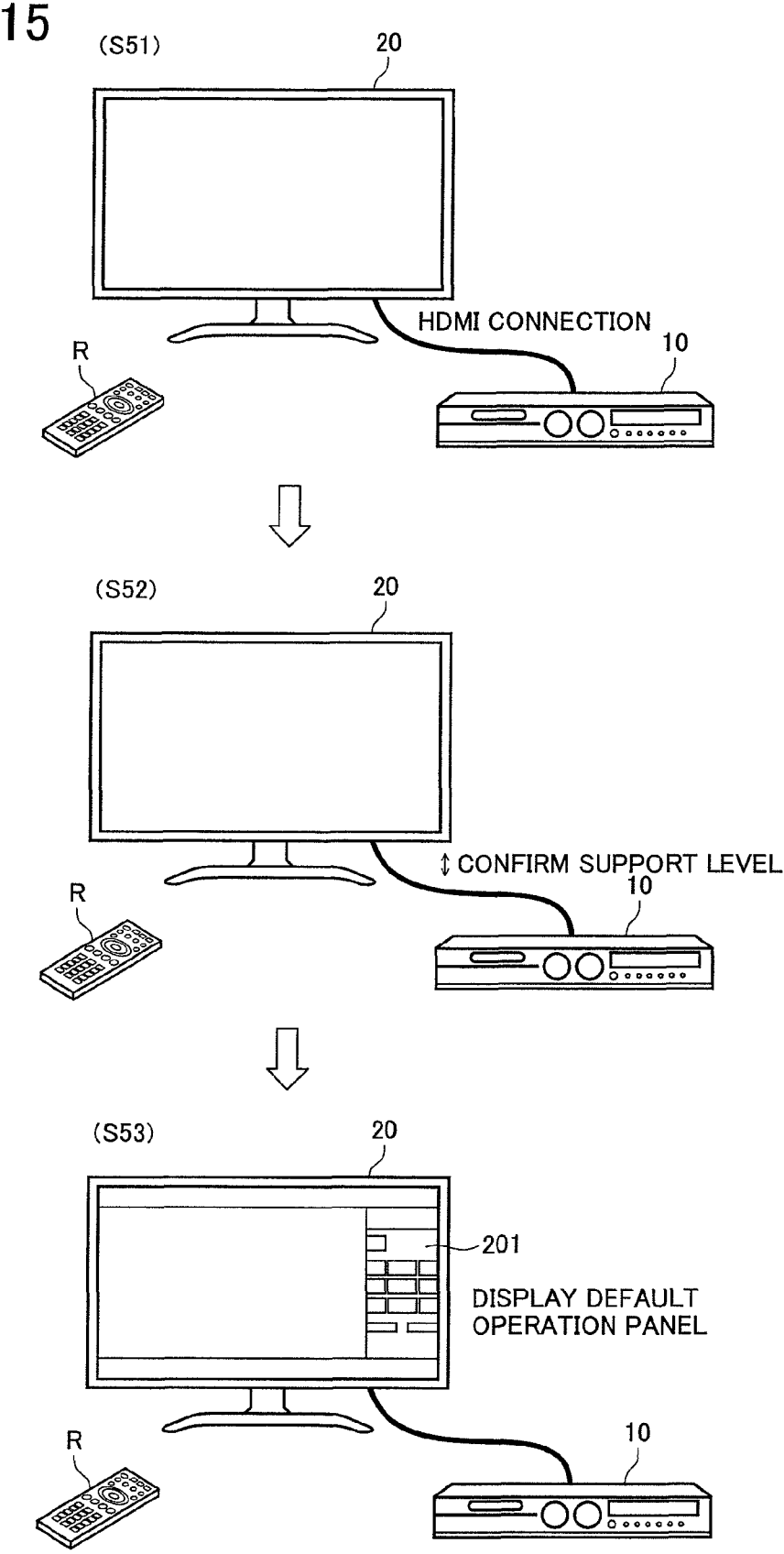
FIG. 15 is a diagram depicting an action example when displaying a default operation panel.

FIG. 15 is a diagram depicting an example of actions performed when displaying a default operation panel. First, when the TV 20 and the recorder 10 are connected via the HDMI (S51), the TV 20 makes an inquiry for confirming the support level to the recorder 10 (S52), and if the recorder 10 is unsupporting, then displays a default operation panel 201 (S53). Here, the TV 20 can automatically select and display a default operation panel corresponding to a peripheral connected thereto from among a plurality of default operation panels that the TV 20 hold. At that time, the TV 20 scales and displays an input video signal so that the input video signal and the default operation panel are not displayed in an overlapping manner.

Figure 16:
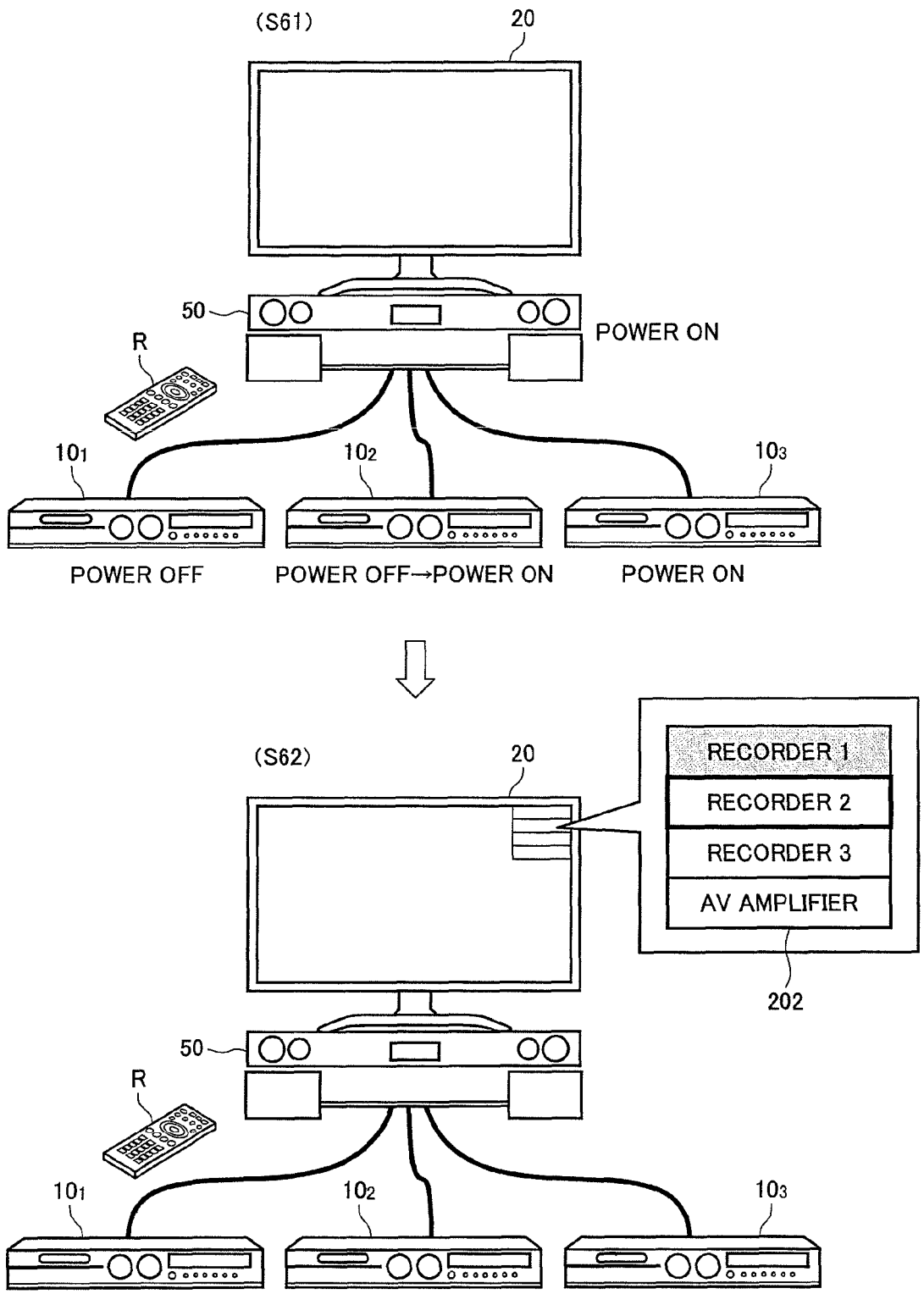
FIG. 16 is a diagram depicting an example of a startup procedure of the operation panel in the case of connecting a plurality of peripherals.

FIG. 16 is a diagram depicting an example of a startup procedure of the operation panel executed when connecting a plurality of peripherals to the TV 20. Here, a case is depicted where one AV amplifier 50 is connected to the TV 20, with three recorders 10₁, 10₂, and 10₃ being connected to the AV amplifier 50. It is assumed that the TV 20, the AV amplifier 50, and the recorder 10₃ are powered on whereas the recorders 10₁ and 10₃ are powered off.

First, the user turns on the power of the recorder 10₂ (S61) and thereafter acts on the remote control R to display a peripheral list 202 of peripherals connected to the TV 20 (S62). The peripheral list 202 carries names of peripherals being currently connected to the TV 20. The recorder 10₁, the recorder 10₂, the recorder 10₃, and the AV amplifier 50 correspond respectively to recorder 1, recorder 2, recorder 3, and AV amplifier. At that time, the display of the recorder 1 being off is grayed out.

In the peripheral list 202, most recently powered-on recorder 2 is recognized as an active peripheral and is displayed in an emphasized manner by a bold frame on the peripheral list 202 so that it can be distinguished from the other peripherals. By selecting the recorder 1 being power-off, the recorder 1 may be powered on and operated. In this case, the display of the recorder 1 is emphasized.

Figure 17:
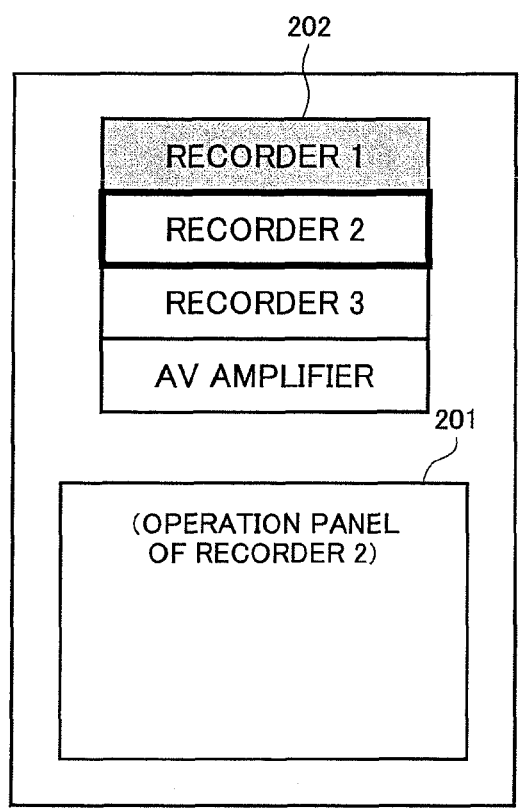
FIG. 17 is a diagram depicting a display example of the default operation panel.

Then, when the user acts on the remote control device R to select a peripheral whose operation panel is desired to be displayed from the peripheral list 202, there appears the default operation panel 201 corresponding to the peripheral. In a display example of the default operation panel 201, it is displayed as depicted in FIG. 15. As another display example of the default operation panel 201, as depicted in FIG. 17, the default operation panel 201 of a peripheral selected by the user may be displayed under the peripheral list 202. In this example, the recorder 2 is selected and the default operation panel 201 of this recorder 2 is displayed.

Although the example of FIG. 16 depicts the startup procedure of the default operation panel in the case of connecting a plurality of peripherals, the startup of the custom operation panel is also basically executed by the similar procedure.

Figure 18:
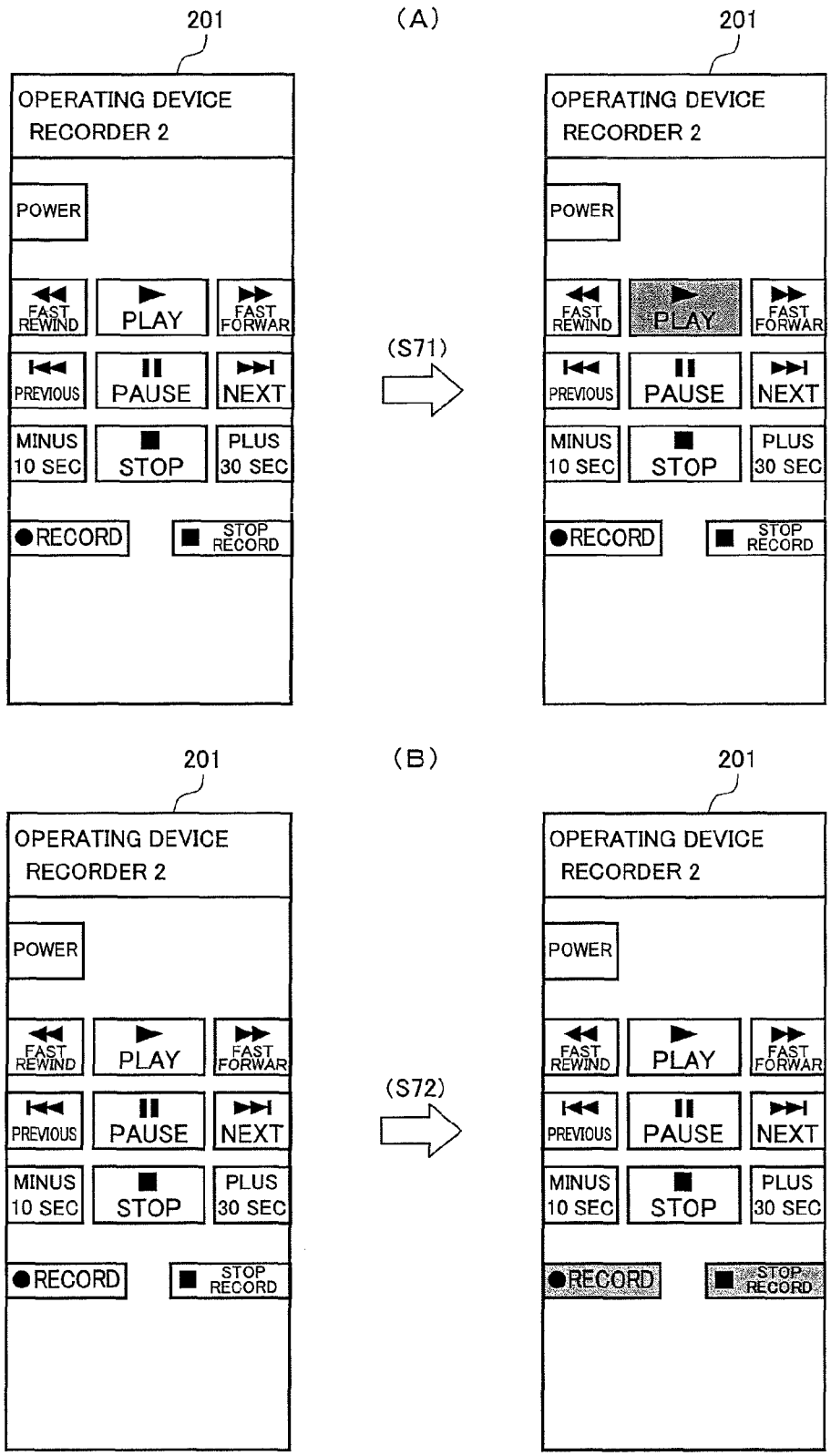
FIG. 18 is a diagram depicting a screen transition example of the default operation panel.

FIG. 18 is a diagram depicting a screen transition example of the default operation panel 201. In FIG. 18(A), when the user acts on the remote control device R to play the recorder 10, it returns a status of on-play to the TV 20. Then, the TV 20 grays out the play button since the play button does not act in spite of depression thereof if the recorder 10 is playing (S71). In FIG. 18(B), if a disc such as BD or DVD is loaded, the recorder 10 notifies the TV 20 of the type of the disc. If the disc is a BDROM, etc., that cannot be recorded, the record button and the record stop button do not function, and therefore the TV 20 grays out these buttons (S72).

Figure 19:
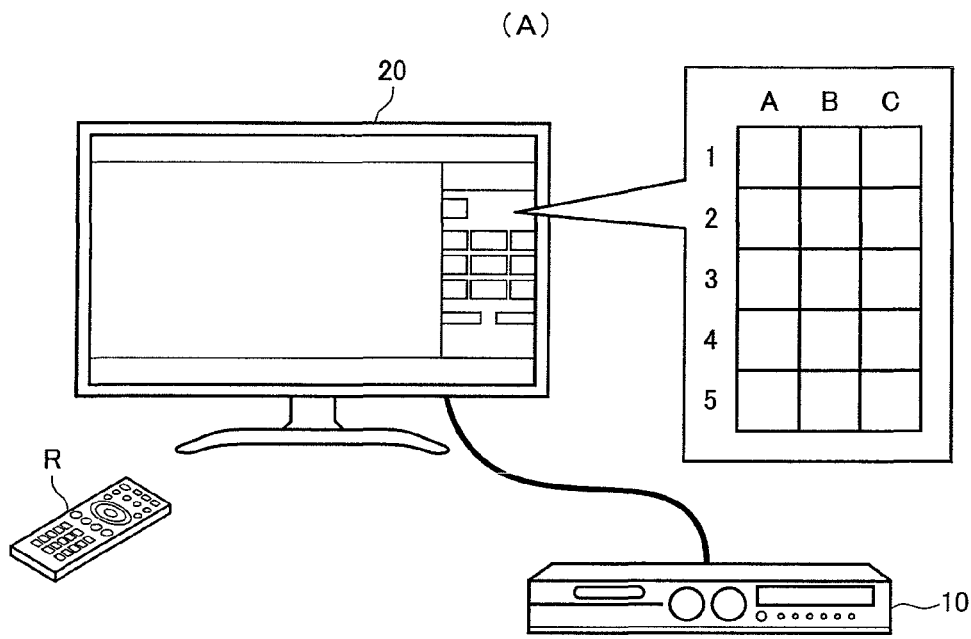
FIG. 19 is a diagram for explaining an action example when displaying a custom operation panel according to the present invention.
Figure 20:
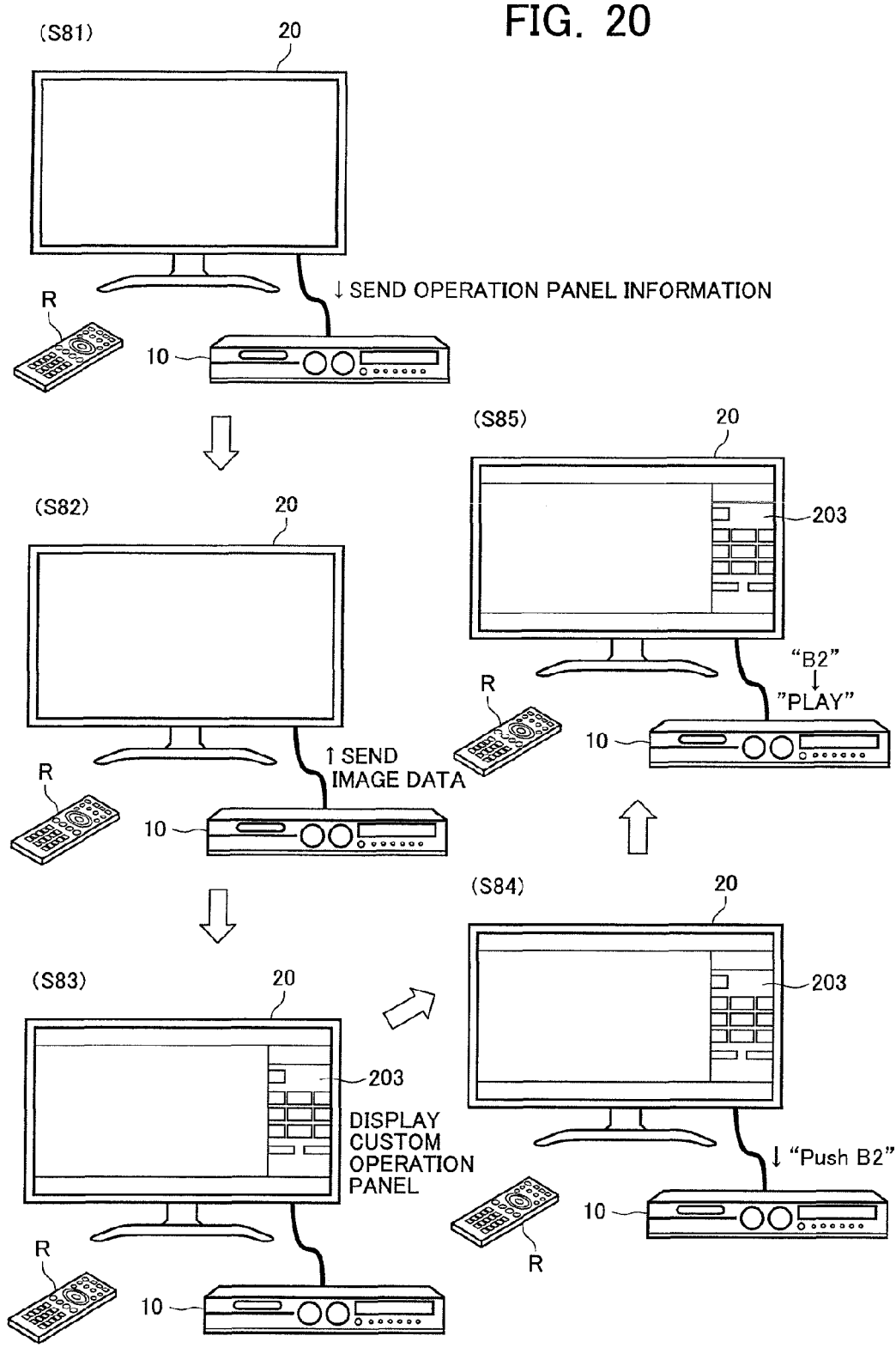
FIG. 20 is a diagram for explaining an action example when displaying the custom operation panel according to the present invention.

FIGS. 19 and 20 are diagrams for explaining action examples when displaying a custom operation panel according to the present invention. As depicted in FIG. 19(A), the TV 20 determines in advance e.g., a region to display the operation panel, and stores it as operation panel information. As already described in FIG. 3, the operation panel information is composed of five pieces of information, i.e., the display region size, the display position, and the number of display colors of the operation panel as well as the display size of the image data for operation buttons and array information (matrix pattern) indicating, in a matrix form, the arrayable position and number of the image data for operation buttons.

As depicted in FIG. 19(B), the recorder 10 correlates the image data for operation buttons with coordinates at which the image data are disposed and correlates the coordinates with functions of the operation buttons, for the retention thereof. For example, although in the case of the play button, the coordinate for array is "B2" and the function is "play", the other operation buttons also have the similar correlations.

In FIG. 20, as set forth above referring to FIG. 4, the TV 20 sends operation panel information to the recorder 10 if it confirms that the recorder 10 supports the operation panel expansion display function (S81). Upon receiving it, the recorder 10 sends the image data for operation buttons and the coordinate thereof to the TV 20 (S82). Then, the TV 20 disposes the image data for operation buttons sent from the recorder 10 at the position corresponding to the coordinate and displays a custom operation panel 203 (S83).

Then, when the user operates the remote control R to depress the play button, the TV 20 recognizes that the coordinate corresponding to the play button is B2 and notifies the recorder 10 of the depression of the coordinate B2 (S84). In response to this notice, the recorder 10 specifies a function (PLAY in this case) corresponding to the coordinate B2 and executes the play function (S85). In this manner, although the TV displays the operation buttons for operating the peripherals connected thereto, the TV need not grasp what functions the operation buttons have and has simply to send the coordinates of the operation buttons. For this reason, the load on the TV can be reduced to a large extent.

Figure 21:
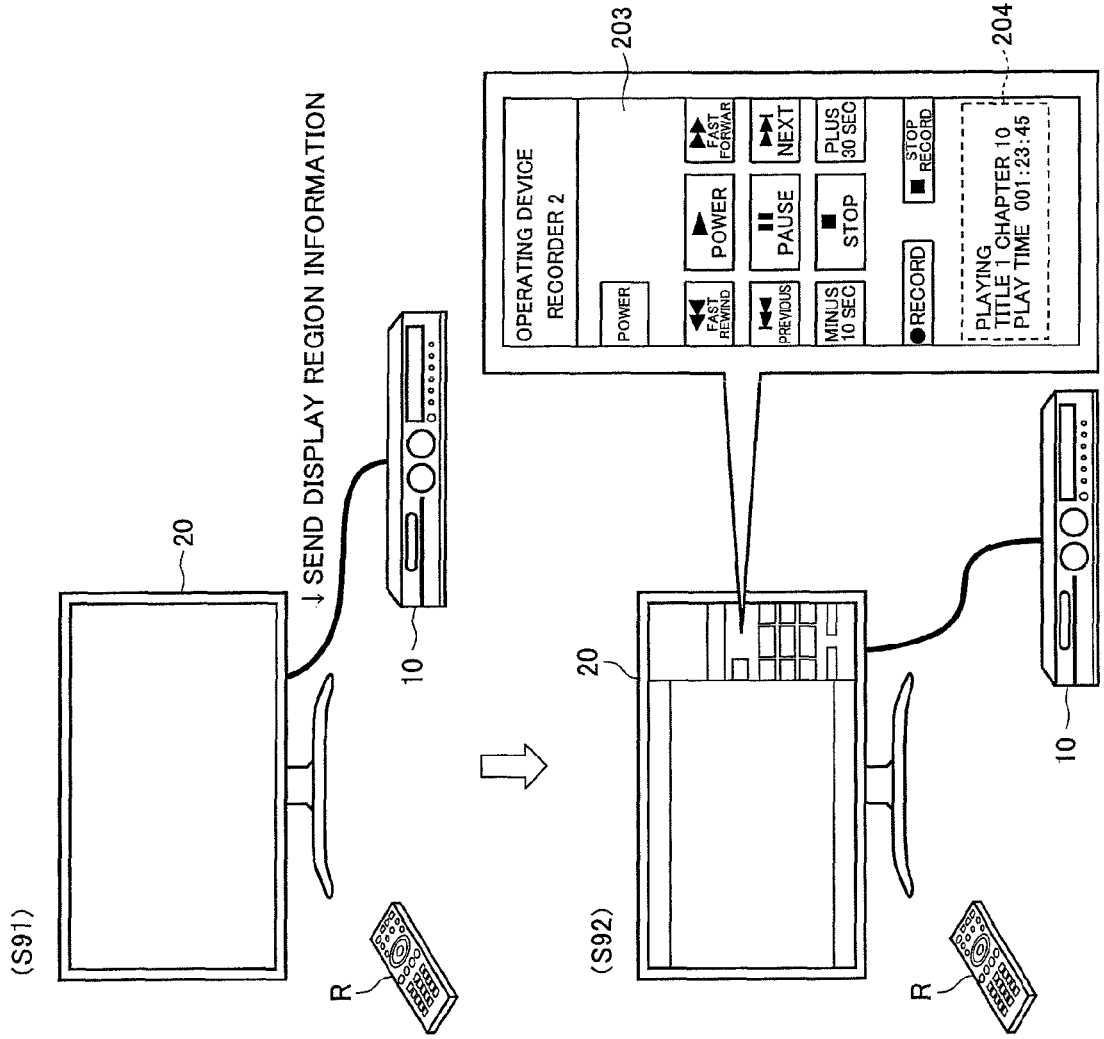
FIG. 21 is a diagram for explaining a display example of the custom operation panel according to the present invention.

FIG. 21 is a diagram for explaining a display example of the custom operation panel according to the present invention. The custom operation panel 203 of this example is provided with an information display region 204 displaying information such as the status of the peripherals (hereinafter referred to as display information) in addition to the display of the image data for operation buttons. The display information means, in the case of the recorder 10, information such as for example the title, chapter, play time, hours, and channel of the program content being currently played.

In this case, it is considered that the TV 20 determines in advance the array position and size of the information display region to be arrayed on the screen so as to impart thereto region identification information (for example, identification number 1, 2, . . . , etc.) for identifying the information display region. Then, the TV 20 retains the operation panel information containing the array position and the size of the information display region and the region identification information. When the operation panel information is sent from the TV 20 to the recorder 10, the recorder 10 determines a region to array the display information and sends the region identification information of this region together with the display information to the TV 20. The TV 20 displays the display information sent from the recorder 10 in the information display region corresponding to the region identification information.

In FIG. 21, as already described in FIG. 4, first, if the TV 20 confirms that the recorder 10 supports the operation panel expansion display function, the TV 20 sends the operation panel information to the recorder 10 (S91). In response to this, the recorder 10 sends to the TV 20 the display information and the region identification information for identifying a region to display the display information. Then, the TV 20 disposes the display information sent from the recorder 10 in the information display region 204 corresponding to the region identification information and displays the custom operation panel 203 (S92).

Figure 22:
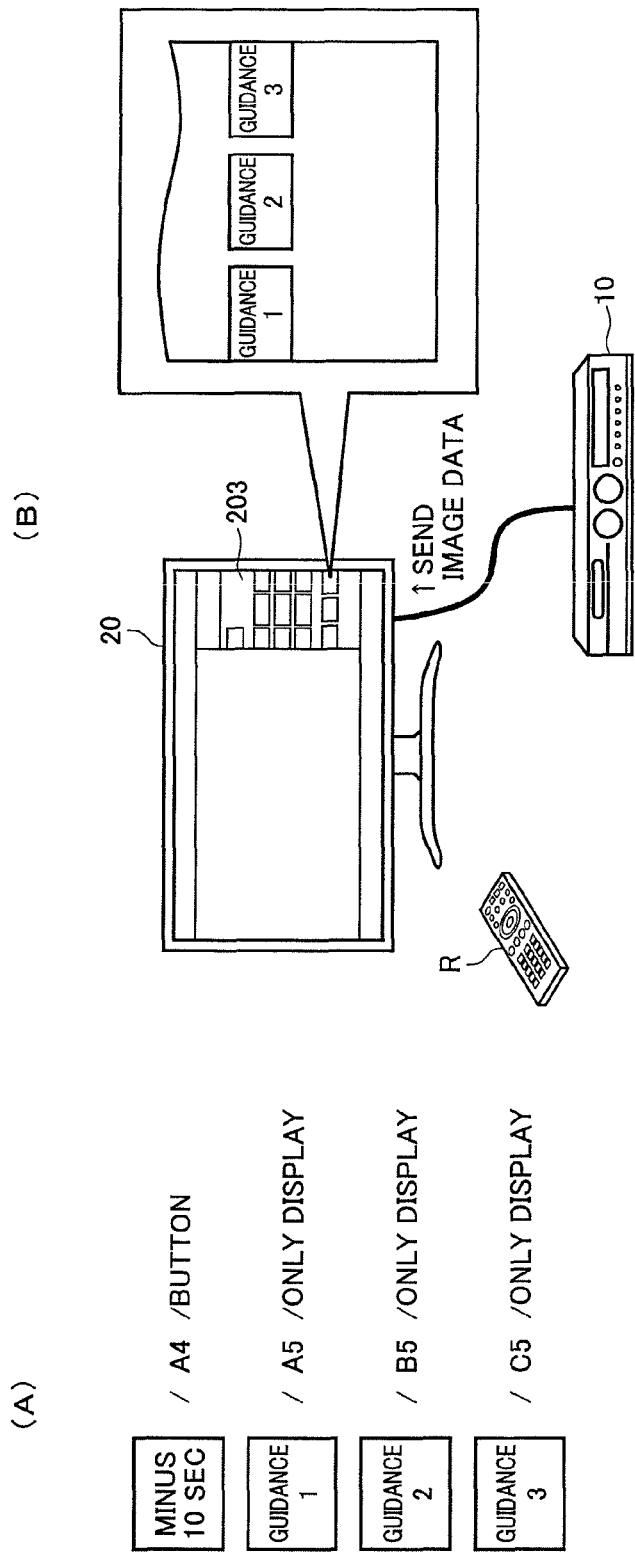
FIG. 22 is a diagram for explaining another display example of the custom operation panel according to the present invention.

FIG. 22 is a diagram for explaining another display example of the custom operation panel according to the present invention. As depicted in FIG. 22(A), the recorder 10 retains the image data for operation buttons, the coordinates to array the image data, and the attributes of the image data in a corresponding relationship. For example, in the case of "−10 sec" button, the array coordinate is "A4" and the attribute is "button", and in the case of "guidance 1" button, the array coordinate is "A5" and the attribute is "only display". Similarly, the attribute "only display" is imparted to the "guidance 2" button and the "guidance 3" button. These guidance buttons are buttons for explaining the operations of the operation buttons, the guidance buttons merely providing a display of the operation guidance and having no operation functions.

In FIG. 22(B), the recorder 10 sends to the TV 20 the image data, the coordinates, and the attributes of the operation button and of the operation guidance buttons. Although the TV 20 displays the operation guidance buttons on the operation panel similarly to the operation button, the TV 20 is controlled so as not send, even if the operation guidance button is depressed, the coordinate thereof to the recorder 10 since the attributes of the operation guidance buttons are only display. Control may be provided such that the operation guidance buttons cannot be selected by prohibiting the cursor from moving thereto.

Although in the example of FIG. 22 the operation guidance buttons 1 to 3 with the attributes of only display are arrayed on the operation panel, the corresponding regions of this operation panel (which corresponds to the coordinates A5 to C5 in this example) may be used as the information display region 204 depicted in FIG. 21. In this case, the recorder 10 specifies the display regions (the coordinates A5 to C5) and sends the display information (the attributes of only display). Naturally, it is also feasible to combine a plurality of coordinate regions, and in this example, the regions of the coordinates A5 to C5 are combined to configure an information display region similar to the information display region 204 depicted in FIG. 21. It's possible to arrange and display, for example, the display information (playing, title 1, chapter 10, play time 001:23:45) of the device depicted in FIG. 21 in the information display region configured in this way.

FIG. 23 is a diagram for explaining a further display example of the custom operation panel according to the present invention. In this example, the recorder 10 retains a plurality of image data for each operation status for one operation button as depicted in FIG. 23(A). In this case, for the stop button, different images are retained for each operation status, that is, "button is valid", "button is invalid", "button is selected", or "button is determined".

Then, as depicted in FIG. 23(B), the recorder 10 sends to the TV 20 the image data for operation buttons containing the image data of the stop button and the coordinates thereof (S101), while the TV 20 disposes the image data for operation buttons sent from the recorder 10 at the positions corresponding to the coordinates to display the custom operation panel 203 (S102). At that time, the TV 20 receives a notice of the operation status from the recorder 10 and, depending on the content of the notice, changes over and displays the plurality of image data for each of the operation buttons. In the example of the stop button, the images are changed over depending on four operation statuses, i.e., the button valid, button invalid, button select, and button determine.

FIG. 24 is a diagram for explaining an action example when the image data for operation buttons are stored and reused in the TV. When first receiving image data for operation buttons from the recorder 10, the TV 20 stores in a corresponding relationship the image data, the corresponding coordinates, and the identification information for identifying the recorder 10 (S111). Then, when there occurs the power on/off or the cable detachment/attachment (S112), the TV 20 acquires the identification information from the recorder 10 and determines whether image data for operation buttons corresponding to the identification information are stored. Then, if the image data for operation buttons are stored, it reads out the image data and disposes them at positions in accordance with the corresponding coordinates (S113).

Although in the above embodiments, the HDMI, HDMI CEC, and HDMI HEC have exemplarily been described as communication means, these are not intended to be limitative, and instead, IEEE1394, LAN, power line communication, radio communication, optical communication, etc., may be utilized. Although the recorder has been described as a typical peripheral, it is natural not to be limited thereto. Examples will be shown below of adaptable peripherals, the contents of operation thereof, and the contents of display thereof.

(1) The recorder and a player can perform operations such as channel selecting operation, playing operation, and recording operation and can display information such as name of a program on play, play time, chapter, track, and recording timer.

(2) Audio equipment can perform operations such as volume operation, input mode change, and sound mode change and can display information such as volume, input mode, and sound mode.

(3) A washing machine can perform operations such as action mode change, start of selecting action, pause, and stop and can display information such as the status of washing (wash/rinse/spin-dry/dry).

(4) A refrigerator can perform operations such as regulation of the interior temperature and setting of additional functions and can display information such as the temperature of the interior (cold compartment/freezing compartment/temperature holding compartment) and ion generation concentration (when having an ion generator).

(5) An air conditioner can perform operations such as change of the set temperature, change of action mode, timer setting, start of action, pause, and stop and can display information such as the room temperature, air direction, air amount, functions (air-conditioning/heating/dehumidifying/air-sending), timer, and ion generation concentration (when having an ion generator).

(6) A vacuum cleaner can perform operations such as change of action mode, start of action, pause, and stop and can display information such as notice of dust disposal time and filter clogging.

(7) An air cleaner, a humidifier, and a dehumidifier can perform operations such as change of action mode, start of action, pause, and stop and can display information such as the temperature, humidity, state of air (clean/dirty).

(8) The ion generator can perform operations such as change of action mode, start of action, pause, and stop and can display information such as ion generation concentration.

(10) A solar power generation device can perform operations such as change of action mode, start of action, pause, and stop and can display information such as power generation amount, consumption corresponding to the power generation amount, and weather.

(11) A cell phone can perform operations such as change of action mode, change of various settings, and outgoing and incoming calls and can display information such as incoming call and arrival of mail.

(12) A telephone, facsimile, and a telephone with liquid crystal display can perform operations such as change of action mode, change of various settings, and outgoing and incoming calls and can display information such as notice of incoming call and name and photograph of the other party.

(13) A photo player can perform operations such as change of action mode, start of action, pause, and stop and can display information such as photograph, thumbnail, and list.

(14) A projector can perform operations such as change of action mode, start of action, pause, and stop and can display information such as picture quality mode.

(15) A microwave oven, a multifunctional microwave oven, and a toaster oven can perform operations such as change of action mode, start of action, pause, and stop and can display information such as cooking time, notice of completion of cooking, and intra-oven temperature.

(16) A rice cooker can perform operations such as change of action mode, start of action, pause, and stop and can display information such as cooking time and notice of completion of cooking.

(17) A multifunctional machine or a copying machine can perform operations such as change of action mode, start of action, pause, and stop and can display information such as the remainder of paper and the remainder of ink.

(18) A wireless camera system (living door scope) can perform operations such as change of action mode and response and can display information such as a notice of intercom and a face of a visitor.

REFERENCE SIGNS LIST

10 . . . recorder, 11 . . . HDMI transmitter, 12,21 . . . main microcomputer, 13 . . . front microcomputer, 14,24 . . . CEC I/F, 15,25 . . . communication I/F, 16,26 . . . remote control light receiving portion, 17,27 . . . HDMI connector, 18, 28 . . . LAN I/F, 19,29 . . . memory portion, 20 . . . TV, 22 . . . HDMI receiver, 23 . . . monitor microcomputer, 30 . . . display portion, 40 . . . HDMI cable, 41 . . . TMDS line, 42 . . . CEC line, 43 . . . HEC line

The invention claimed is:

1. A peripheral control system having at least one peripheral and a display device capable of displaying an operation panel of the peripheral connected thereto, wherein
the display device comprises a first memory portion that stores operation panel information containing array information that indicates in a form of a matrix pattern the arrayable positions and number of image data for operation buttons in order to array the image data for operation buttons making up the operation panel of the peripheral on a screen and a sending portion that communicates with the peripheral,
the peripheral comprises a second memory portion that stores the image data for operation buttons, an operation panel information acquiring portion that acquires operation panel information stored in the first memory portion of the display device, a peripheral control portion that correlates the image data for operation buttons stored in the second memory portion with the array information depending on the operation panel information acquired by the operation panel information acquiring portion from the display device, and an image data sending portion that sends to the display device the image data for operation buttons which is correlated with the array information by the peripheral control portion;
the display device comprises a display device control portion that controls to dispose and display the image data for operation buttons sent from the image data sending portion of the peripheral at a position corresponding to the array information when displaying the operation panel of the peripheral; and
wherein when one of the image data for operation buttons is selectively specified by a user, the display device control portion of the display device controls to send the array information of the selectively specified image data for operation buttons from the sending portion buttons from the sending portion to the peripheral.

2. The peripheral control system as defined in claim 1, wherein
the peripheral comprises a data table that correlates the array information correlated with the image data for operation buttons with functions allocated to each of the image data for operation buttons, and the peripheral control portion specifies from the data table a function corresponding to the array information of the image data for operation buttons sent from the display device, and executes the specified function.

3. The peripheral control system as defined in claim 1, wherein
the display device control portion of the display device, for an input video signal input to the display device, scales an input video signal such that a display region of the input video signal does not overlap with a display region of the operation panel of the peripheral.

4. The peripheral control system as defined in claim 1, wherein
when sending the image data for operation buttons correlating to the array information to the display device, the peripheral control portion of the peripheral controls to send information indicating that the image data for operation buttons has a function of operation buttons or a function of only for display as attribute information indicative of an attribute of each of the image data for operation buttons from the image data sending portion to the display device.

5. The peripheral control system as defined in claim 1, wherein
the operation panel information includes display size information indicative of a display region size and a display position of the operation panel, and a display size of the image data for operation buttons, the array information containing arrayable positions and number of the image data for operation buttons.

6. The peripheral control system as defined in claim 5, wherein
the peripheral has a first display size of the image data for operation buttons, and wherein
if the first display size does not coincide with a second display size indicated by the display size information sent from the display device, then the peripheral control portion of the peripheral acquires offset information for adjusting a position to array the image data for operation buttons of the first display size so as to fit the second display size when sending the image data for operation buttons in correspondence with the array information to the display device and controls to send the offset information from the image data sending portion to the display device.

7. The peripheral control system as defined in claim 5, wherein
the peripheral has a first display size of the image data for operation buttons, and wherein
if the first display size does not coincide with a second display size indicated by the display size information sent from the display device, then the peripheral control portion of the peripheral resizes the image data for operation buttons of the first display size so as to fit the second display size when sending the image data for operation buttons in correspondence with the array information to the display device.

8. The peripheral control system as defined in claim 5, wherein
the peripheral control portion of the peripheral controls to send, from the image data sending portion to the display device, combination information for combining a plurality of regions corresponding to a plurality of array positions indicated by the array information with one region when sending to the display device the image data for operation buttons by correlating to the array information.

9. The peripheral control system as defined in claim 1, wherein
the second memory portion of the peripheral stores and has plural types of array patterns of the image data for operation buttons, and the peripheral control portion determines whether one of the plural types of array patterns coincides with a matrix pattern indicated by the array information sent from the display device, selects the coincident array pattern, if coincides, and, if not, selects a maximum array pattern accommodated within the matrix pattern indicated by the array information.

10. The peripheral control system as defined in claim 1, wherein
the first memory portion of the display device stores and has the image data for operation buttons sent from the peripheral together with identification information of the peripheral by correlating to the array information, and wherein
at the time of next connection with the peripheral, the display device control portion of the display device specifies the image data for operation buttons stored in the display device, based on the identification information of the peripheral, and controls to dispose and display the specified image data for operation buttons at a position corresponding to the array information.

11. The peripheral control system as defined in claim 1, wherein
the peripheral control portion of the peripheral controls to send from the image data sending portion to the display device a plurality of image data for operation buttons differing for each operation status for one operation button, and wherein
the display device control portion of the display device, when operation status of the operation button is informed from the peripheral, controls to change over and display the plurality of image data for operation buttons of the operation button sent from the peripheral, depending on the informed operation status of the operation button.

12. The peripheral control system as defined in claim 1, wherein
the display device control portion of the display device determines whether the peripheral supports operation panel display function provided by the peripheral control system, if supports, controls to send the operation panel information from the sending portion to the peripheral, and, if not, controls to display a default operation panel corresponding to the peripheral held by the display device.

13. The peripheral control system as defined in claim 1, wherein
the peripheral control portion of the peripheral notifies the display device of substituting some of the operation buttons making up the operation panel of the peripheral with operation buttons of a default operation panel corresponding to the peripheral held by the display device, depending on the operation panel information sent from the display device, and simultaneously controls to send from the image data sending portion to the display device remaining image data for operation buttons making up the operation panel of the peripheral by correlating to the array information.

14. The peripheral control system as defined in claim 13, wherein
when, based on a notice from the peripheral, substituting some of the operation buttons making up the operation panel of the peripheral with operation buttons of a default operation panel corresponding to the peripheral held by the display device, if the substituted operation button is selectively specified by the user, then the display device control portion of the display device controls to send an operation command corresponding to the selectively specified operation button from the sending portion to the peripheral.

15. A display device making up the peripheral control system as defined in claim 1.

16. A peripheral making up the peripheral control system as defined in claim 1.

* * * * *